United States Patent
Inoue et al.

(10) Patent No.: US 9,506,432 B2
(45) Date of Patent: Nov. 29, 2016

(54) SEALING DEVICE

(71) Applicant: NOK CORPORATION, Tokyo (JP)

(72) Inventors: Masahiko Inoue, Fujisawa (JP); Tomonari Saito, Fujisawa (JP); Yasushi Sasaki, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 14/903,515

(22) PCT Filed: May 28, 2014

(86) PCT No.: PCT/JP2014/064085
§ 371 (c)(1),
(2) Date: Jan. 7, 2016

(87) PCT Pub. No.: WO2015/005007
PCT Pub. Date: Jan. 15, 2015

(65) Prior Publication Data
US 2016/0146167 A1 May 26, 2016

(30) Foreign Application Priority Data

| Jul. 9, 2013 | (JP) | 2013-143484 |
| Jul. 9, 2013 | (JP) | 2013-143485 |
| Dec. 18, 2013 | (JP) | 2013-261139 |

(51) Int. Cl.
*F02M 35/12* (2006.01)
*F02M 29/04* (2006.01)
(Continued)

(52) U.S. Cl.
CPC .......... *F02M 35/1211* (2013.01); *F02D 9/104* (2013.01); *F02F 11/00* (2013.01); *F02M 29/04* (2013.01); *F02M 35/10091* (2013.01); *F02M 35/1216* (2013.01)

(58) Field of Classification Search
CPC ............ F02M 35/1211; F02M 35/1216; F02M 35/10262; F02M 35/10295; F02M 35/10091; F02M 29/04

USPC ............ 181/229, 252, 256, 258; 123/184.53
See application file for complete search history.

(56) References Cited

U.S. PATENT DOCUMENTS

| 4,672,940 A * | 6/1987 | Nakayama ............. F02M 29/04 |
| | | 123/590 |
| 4,756,294 A * | 7/1988 | Nakayama ........... F02M 31/135 |
| | | 123/549 |

(Continued)

FOREIGN PATENT DOCUMENTS

| JP | S63-110666 U | 7/1988 |
| JP | H10-37820 A | 2/1998 |

(Continued)

*Primary Examiner* — Jeremy Luks
(74) *Attorney, Agent, or Firm* — Harness, Dickey & Pierce, P.L.C.

(57) ABSTRACT

A sealing device that is capable of suppressing the generation of unusual noise by guiding a gas flow and suppressing the generation of unusual noise caused by resonance between the gas flow and a pipe. An intake noise reduction portion (20) includes a flow-guiding net portion (21) for guiding a gas flowing in an intake pipe, an annular frame body portion (22) for supporting the flow-guiding net portion (21), a cylindrical portion (23) that extends from the frame body portion (22) in a direction in which the pipe extends, and is fitted into an inner circumferential surface of a second pipe (220) and a flange portion (24) that extends from an end portion of the cylindrical portion (23) toward an outer circumferential surface side, and is disposed in a space between an end surface of a first pipe (210) and an end surface of the second pipe (220). A gasket portion (10) is provided on both surfaces of the flange portion (24).

12 Claims, 11 Drawing Sheets

(51) Int. Cl.
*F02D 9/10* (2006.01)
*F02F 11/00* (2006.01)
*F02M 35/10* (2006.01)

(56) References Cited

U.S. PATENT DOCUMENTS

| | | | | |
|---|---|---|---|---|
| 5,482,249 | A * | 1/1996 | Schafbuch | F16K 47/08 138/44 |
| 6,145,544 | A * | 11/2000 | Dutertre | F16L 55/02718 138/39 |
| 6,458,303 | B1 * | 10/2002 | Fuehrer | B01D 29/071 210/455 |
| 7,730,997 | B2 | 6/2010 | Asada et al. | |
| 7,845,688 | B2 * | 12/2010 | Gallagher | F16L 9/147 138/44 |
| 2009/0038880 | A1 | 2/2009 | Asada et al. | |

FOREIGN PATENT DOCUMENTS

| | | | |
|---|---|---|---|
| JP | 2002155817 A | * | 5/2002 |
| JP | 2007-247547 A | | 9/2007 |
| JP | 2007-303341 A | | 11/2007 |
| JP | 2008-014279 A | | 1/2008 |
| JP | 2009-185729 A | | 8/2009 |
| JP | 2009-257592 A | | 11/2009 |
| JP | 2010-138957 A | | 6/2010 |
| JP | 2011-236853 A | | 11/2011 |

* cited by examiner

SEALING DEVICE

CROSS-REFERENCE TO RELATED APPLICATIONS

This application is a National Stage of International Application No. PCT/JP2014/064085, filed May 28, 2014, which claims priority to Japanese Application No. 2013-143484, filed Jul. 9, 2013, Japanese Application No. 2013-143485, filed Jul. 9, 2013, and Japanese Application No. 2013-261139, filed Dec. 18, 2013. The entire disclosures of each of the above applications are incorporated herein by reference.

FIELD

The present disclosure relates to a sealing device that is equipped in an intake pipe.

BACKGROUND

Conventionally, there has been known a technique in which a flow-guiding net or the like for reducing intake noise is provided to a gasket that seals a gap between end surfaces of two pipes configuring an intake pipe (see Patent Literatures 1 to 3). This technique suppresses the generation of unusual noise by guiding the gas flowing in the intake pipe. However, although a resonance between the gas flowing in the intake pipe and the pipe can be pointed out as a cause of the unusual noise, the foregoing technique has not taken any measures against the resonance.

In a case of a general gasket that is not provided with a flow-guiding net or the like, a mounting groove for mounting the gasket is provided on an end surface of a member to be sealed, and the gasket is provided with a projection that makes close contact'] to a side surface of this mounting groove. Such a configuration makes it possible to stabilize the posture of the gasket in the mounting groove (see Patent Literature 4 and 5).

On the other hand, in cases where a configuration is adopted in which a gasket is provided with a flow-guiding net or the like, while its sealability is not affected, such groove for stably installing the gasket as shown in, for example, FIG. 6 of Patent Literature 1, cannot be provided. Accordingly, in those cases, installation workability of the gasket is low and there is a possibility that the posture of the gasket becomes unstable.

CITATION LIST

Patent Literature

Patent Literature 1: Japanese Patent Application Laid-open No. 2007-247547
Patent Literature 2: Japanese Patent Application Laid-open No. 2008-14279
Patent Literature 3: Japanese Patent Application Laid-open No. 2011-236853
Patent Literature 4: Japanese Patent Application Laid-open No. 2009-257592
Patent Literature 5: Japanese Patent Application Laid-open No. 2010-138957

SUMMARY

Technical Problem

An object of the present disclosure is to provide a sealing device that is capable of not only suppress the generation of unusual noise by guiding a gas flow but also suppressing the generation of unusual noise caused by resonance between the gas flow and a pipe, and that is superior in installation workability and ability to maintain posture of a gasket portion.

Solution to Problem

The present disclosure employs the following means to solve the foregoing object.

That is, a sealing device according to the present disclosure is a sealing device that includes a gasket portion made of an elastic body for sealing a space between an end surface of one of two pipes configuring an intake pipe and an end surface of another of the two pipes, and an intake noise reduction portion for reducing intake noise, wherein the intake noise reduction portion includes: a main body portion for reducing intake noise; an annular frame body portion for supporting the main body portion; a tubular portion that extends from the frame body portion in a direction in which the pipes extend, and is fitted into an inner circumferential surface of either one of the one pipe and the other pipe; and a flange portion that extends from an end portion of the tubular portion toward an outer circumferential surface side, and is disposed in the space between the end surfaces of the one pipe and the other pipe, and the gasket portion is provided on both surfaces of the flange portion.

According to the sealing device of the present disclosure, because the gasket portion and the intake noise reduction portion are provided, the sealing device can exert not only a sealing function but also an intake noise reducing function. The position for disposing the main body portion in the intake pipe can be adjusted by setting the length of the tubular portion of the intake noise reduction portion. Therefore, a distance between a throttle valve and the main body portion can be adjusted, and the effect of reducing intake noise can sufficiently be exerted by disposing the main body portion in a position that produces a high intake noise reduction effect. In addition, because the tubular portion of the intake noise reduction portion is fitted into the inner circumferential surface of either one of the two pipes configuring the intake pipe, the generation of unusual noise due to the resonance can be suppressed at this fitted portion.

Also, because the tubular portion of the intake noise reduction portion is fitted into the inner circumferential surface of either one of the two pipes configuring the intake pipe, an installation of the sealing device to the intake pipe can be done with ease. Moreover, there is no need to provide a groove for mounting the gasket portion in the pipe in order to make the posture of the gasket portion stable.

Moreover, another sealing device according to the present disclosure is a sealing device that includes a gasket portion made of an elastic body for sealing a space between an end surface of one of two pipes configuring an intake pipe and an end surface of another of the two pipes, and an intake noise reduction portion for reducing intake noise, wherein the intake noise reduction portion includes: a main body portion for reducing intake noise; an annular frame body portion for supporting the main body portion; a tubular portion that extends from the frame body portion in a direction in which the pipes extend, an elastically deforming portion that is provided on an outer circumferential surface of the tubular portion, and is in close contact with an inner circumferential surface of either one of the one pipe and the other pipe thereby supporting the tubular portion in its positioned state within the pipe by an elastic repulsive force thereof; and a flange portion that extends from an end portion of the tubular portion toward an outer circumferential surface side, and is disposed in the space between the end surfaces of the one pipe and the other pipe, and the gasket portion is provided on both surfaces of the flange portion.

According also to the sealing device of the present disclosure, because the gasket portion and the intake noise reduction portion are provided, the sealing device can exert not only a sealing function but also an intake noise reducing function. The position for disposing the main body portion in the intake pipe can be adjusted by setting the length of the tubular portion of the intake noise reduction portion. Therefore, a distance between a throttle valve and the main body portion can be adjusted, and the effect of reducing intake noise can sufficiently be exerted by disposing the main body portion in a position that produces a high intake noise reduction effect. In addition, because the elastically deforming portion is provided on the outer circumferential surface of the tubular portion of the intake noise reduction portion, and is in close contact with the inner circumferential surface of either one of the two pipes configuring the intake pipe, the generation of unusual noise due to the resonance can be suppressed at this close-contacting portion.

Also, in the case of the present disclosure, because such configuration in which the elastically deforming portion is in close contact with the inner circumferential surface of the pipe, a space can be provided between the outer circumferential surface of the tubular portion and the inner circumferential surface of the pipe. Therefore, in combination with an elastic deformation of the elastically deforming portion, it is not necessary to improve dimensional accuracies of the tubular portion and the like. In addition, the generation of unusual noise due to a backlash between the inner circumferential surface of the pipe and the intake noise reduction portion.

Also, because the tubular portion having the elastically deforming portion on its outer circumferential surface can be inserted into either one of the two pipes configuring the intake pipe, an installation of the sealing device to the intake pipe can be done with ease. Moreover, there is no need to provide a groove for mounting the gasket portion in the pipe in order to make the posture of the gasket portion stable.

The main body portion may be configured from a flow-guiding net portion for guiding a gas flowing in the intake pipe.

According to this configuration, it becomes possible to suppress the generation of unusual noise by guiding the gas flow by the flow-guiding net portion.

The main body portion may be configured from a plurality of suspended portions that are configured to sway in response to the gas flow.

Accordingly, the gas flow will be dispersed due to the plurality of suspended portions. In a case where the plurality of suspended portions are made of a rubber-like elastic body, the damping performance of the rubber-like elastic body can damp the energy that generates noise. Owing to the combination of these effects, intake noise can be reduced effectively. In addition, the plurality of suspended portions deform in a direction of the gas flow in response to the gas flow, thereby suppressing the inflow resistance of the gas. Thus, the pressure loss of the gas to be suctioned does not increase.

Each of the plurality of suspended portions may be provided with at least one through-hole.

Such configuration can further lower the inflow resistance of the gas.

The flow-guiding net portion may be configured such that a mesh thereof is fine in a vicinity of a center of a flow passage in the intake pipe and becomes coarser with distance from the vicinity of the center.

In the beginning of an opening of the throttle valve, air flowing through two places that are most distant from a rotating axis of the throttle valve are the main flows. That is when the rotating axis is provided so as to extend in the horizontal direction, an air flow through the upper side and an air flow through the lower side are the main flows. In the present disclosure, the mesh of the flow-guiding net portion disposed on the lower side of the throttle valve is configured to be fine in the vicinity of the center of the flow passage in the intake pipe and to become coarser with distance from the vicinity of the center. Accordingly, since the air tends to flow through a coarse region within the mesh, the air flow is guided such that more air flows through the region within the intake pipe that is more distant from the vicinity of the center. Consequently, it is possible to suppress the merging of the air flows through the two places.

The mesh of the flow-guiding net portion may be formed of a plurality of radial portions extending radially outward from the vicinity of the center of the flow passage in the intake pipe and a plurality of concentric circular portions provided concentrically from the vicinity of the center. Note that the "concentric circular portion" in the present disclosure includes not only a complete circular shape but also an arcuate shape such as a semicircle.

According to such a configuration, it is possible to realize the flow-guiding net portion in which the mesh is configured to be fine in the vicinity of the center of the flow passage in the intake pipe and to become coarser with distance from the vicinity of the center. In addition, in the case where the flow-guiding net portion is configured from an elastic material, the flow-guiding net portion elastically deforms due to the air flow. However, a shape obtained by projecting the flow-guiding net portion configured as described above in a direction of the air flow changes little between before and after the deformation. Therefore, the flow-guiding function is stably exhibited. In addition, even if the flow-guiding net portion is configured from the elastic material, when the flow-guiding net portion is elastically deformed by the air flow, a uniform force acts on the radial portions, and hence a uniform force acts on the entire flow-guiding net portion. Therefore, the flow-guiding net portion is superior in durability.

Advantageous Effects of the Disclosure

As described above, the present disclosure can provide a sealing device that is capable of not only suppressing the generation of unusual noise by guiding a gas flow but also suppressing the generation of unusual noise caused by resonance between the gas flow and a pipe, and that is superior in installation workability and ability to maintain posture of a gasket portion.

DRAWINGS

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

Example 1

Figure 1:
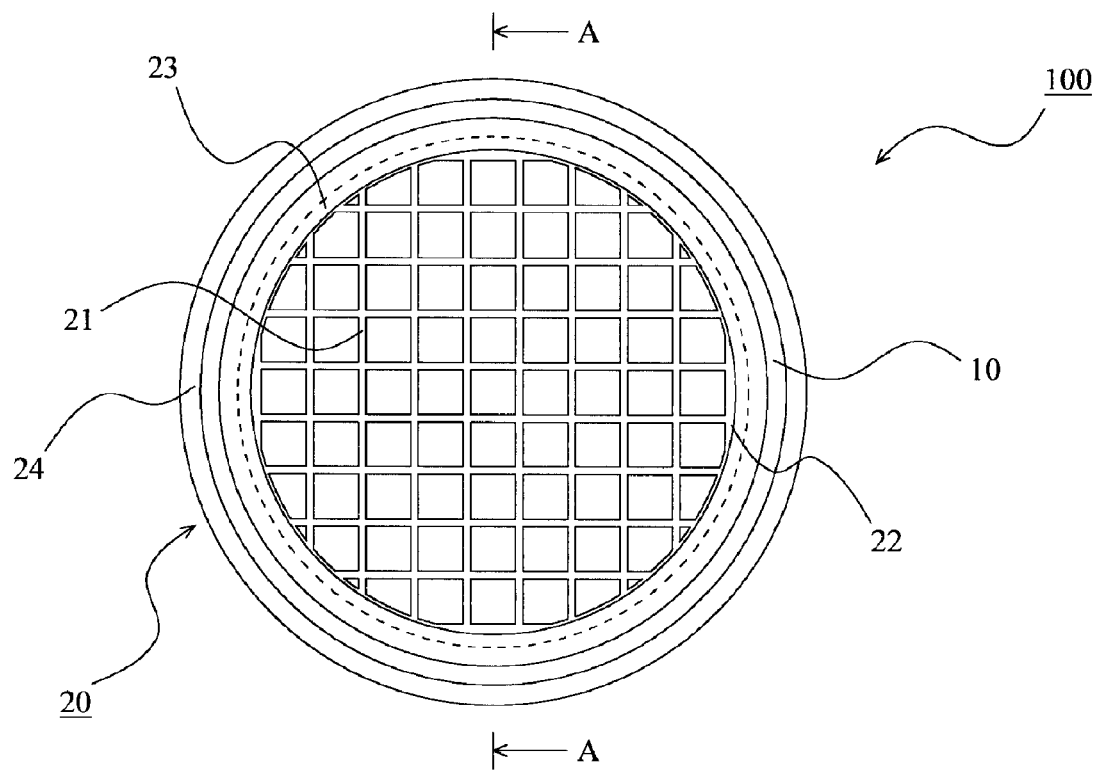
FIG. 1 is a front view of a sealing device according to Example 1 of the present disclosure.
Figure 2:
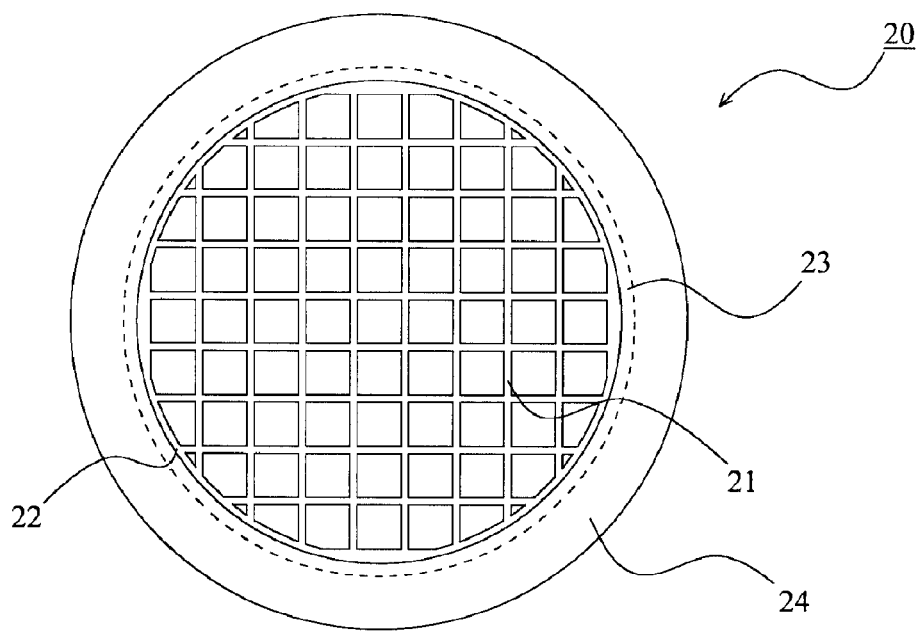
FIG. 2 is a front view of an intake noise reduction portion according to Example 1 of the present disclosure.
Figure 3:
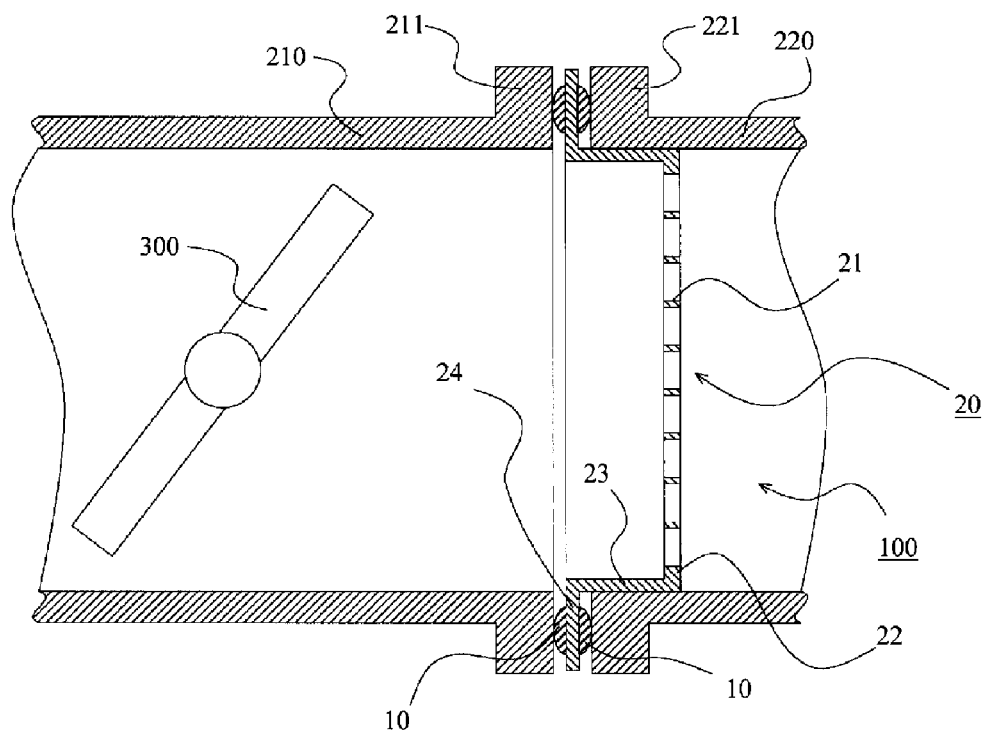
FIG. 3 is a schematic cross-sectional view showing a state in which the sealing device according to Example 1 of the present disclosure is attached to an intake pipe.

A sealing device according to Example 1 of the present disclosure is described with reference to FIGS. 1 to 3. FIG. 1 is a front view of a sealing device according to Example 1 of the present disclosure. FIG. 2 is a front view of an intake noise reduction portion according to Example 1 of the present disclosure. Specifically, FIG. 2 shows a state of the sealing device shown in FIG. 1 prior to be integrally molded with a gasket portion. FIG. 3 is a schematic cross-sectional view showing a state in which the sealing device according to Example 1 of the present disclosure is attached to an intake pipe. Note that the view of the sealing device shown in FIG. 3 is a cross-sectional view taken along AA of FIG. 1.

<Sealing Device>

A sealing device 100 according to the present example is equipped in an intake pipe provided to an intake manifold and the like. That is, the sealing device 100 according to the present example is equipped in a joint portion between two pipes configuring the intake pipe. For convenience of explanation, these two pipes are referred to hereinafter as the first pipe 210 and the second pipe 220. The sealing device 100 is disposed on a downstream side of a throttle valve 300 provided in the intake pipe in a direction of a gas flow.

An end portion of the first pipe 210 and an end portion of the second pipe 220 are provided with flange portions 211, 221, respectively. The first pipe 210 and the second pipe 220 are coupled to each other by placing the flange portion 211 and the flange portion 221 on top of each other and fixing these flange portions with a known fixture (not shown) such as a bolt. The first pipe 210 and the second pipe 220 are each in a shape of a cylinder having a circular cross section perpendicular to the central axial line of an intake passage (a cross section perpendicular to a direction of extension of the pipes). Hereinafter, the term "axial direction" denotes a direction of the central axial line of the intake passage.

The sealing device 100 is provided integrally with a gasket portion 10 for sealing a space between an end surface of the first pipe 210 and an end surface of the second pipe 220, and an intake noise reduction portion 20 for reducing intake noise. The gasket portion 10 is composed from an elastic body (e.g., an elastomer such as rubber and TPE).

<Intake Noise Reduction Portion>

The intake noise reduction portion 20 is configured from a flow-guiding net portion 21, an annular frame body portion 22 for supporting the flow-guiding net portion 21, a cylindrical portion 23 as a tubular portion, and a flange portion 24.

The flow-guiding net portion 21 functions to guide a gas flowing inside the intake pipe and is provided over the entire region within the frame body portion 22 in the present example. Specifically, the main body portion of the intake noise reduction portion 20 according to the present example is configured from the flow-guiding net portion 21 that guides the gas flowing inside the intake pipe. The cylindrical portion 23 extends in the direction in which the pipe extends from the frame body portion 22 (the axial direction), and is fitted into an inner circumferential surface of the second pipe 220. Specifically, the outer diameter of the cylindrical portion 23 is set to be slightly larger than the inner diameter of the second pipe 220. Accordingly, the cylindrical portion 23 is fitted into the inner circumferential surface of the second pipe 220 by inserting the cylindrical portion 23 into the second pipe 220. The flange portion 24 extends from an end portion of the cylindrical portion 23 toward an outer circumferential surface side and is disposed in the space between the end surface of the first pipe 210 and the end surface of the second pipe 220.

<Gasket Portion>

The gasket portions 10 are provided on both surfaces of the flange portion 24 in the intake noise reduction portion 20. Thus, each of the gasket portions 10 provided on both surfaces of the flange portion 24 seals the space between the end surface of the flange portion 211 of the first pipe 210 and the end surface of the flange portion 221 of the second pipe 220 by being sandwiched therebetween.

Note that the sealing device 100 that is formed integrally with the gasket portion 10 and the intake noise reduction portion 20 can be obtained by insert-molding the gasket portion 10 using the intake noise reduction portion 20 as an insert. The sealing device 100 can also be provided integrally with the gasket portion 10 and the intake noise reduction portion 20 by screen-printing the gasket portion 10 on both surfaces of the flange portion 24 in the intake noise reduction portion 20.

<Advantages of Sealing Device According to Present Example>

According to the sealing device 100 of the present example, because the gasket portion 10 and the intake noise reduction portion 20 are provided, the sealing device 100 can exert not only a sealing function but also an intake noise reducing function.

In addition, because the intake noise reduction portion 20 includes the flow-guiding net portion 21, it can suppress the generation of unusual noise by guiding the gas flow. In so doing, the position for disposing the flow-guiding net portion 21 in the intake pipe can be adjusted by setting the length of the cylindrical portion 23 (the length in the axial direction) of the intake noise reduction portion 20. Consequently, the distance between the throttle valve 300 and the flow-guiding net portion 21 can be adjusted. Therefore, by disposing the flow-guiding net portion 21 in a position that produces a high intake noise reduction effect, the effect of reducing intake noise can sufficiently be exerted. In other words, according to a conventional example, the position of the flow-guiding net is determined in the position where the two pipes are coupled to each other, making it impossible to adjust the distance between the throttle valve and the flow-guiding net. To the contrary, according to the present example, the position of the flow-guiding net portion 21 can be adjusted as described above, thereby sufficiently exerting the effect of suppressing the generation of unusual noise by means of the flow-guiding net portion 21.

In the present example, the cylindrical portion 23 of the intake noise reduction portion 20 is fitted into the inner circumferential surface of the second pipe 220. Thus, the generation of unusual noise due to the resonance can be suppressed at this fitted portion.

Moreover, because the cylindrical portion 23 of the intake noise reduction portion 20 is fitted into the inner circumferential surface of the second pipe 220, the sealing device 100 can be held stably with respect to the second pipe 220 by this fitted portion. Therefore, an installation of the sealing device 100 into the intake pipe can be done with ease. In addition, there is no need to provide an annular groove for mounting the gasket portion 10 in the pipes (i.e., the flange portions 211, 221) in order to make the posture of the gasket portion 10 stable. Note that, because the posture of the gasket portion 10 is stabilized, its sealing performance can be exerted stably.

As described thus far, according to the sealing device 100 of the present example, it is possible to not only suppress the generation of unusual noise by guiding the gas flow but also suppressing the generation of unusual noise caused by resonance between the gas flow and the pipe. In addition, the sealing device 100 is superior in installation workability.

Moreover, the sealing device 100 is superior in stability of the posture of the gasket portion 10.

Example 2

Figure 4:
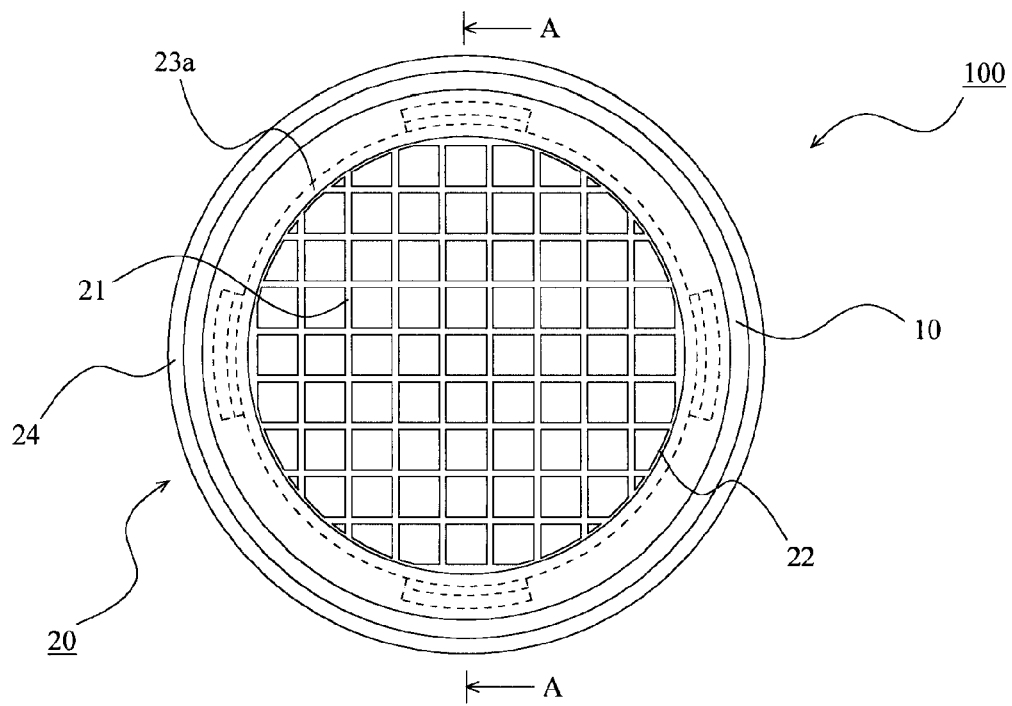
FIG. 4 is a front view of a sealing device according to Example 2 of the present disclosure.
Figure 5:
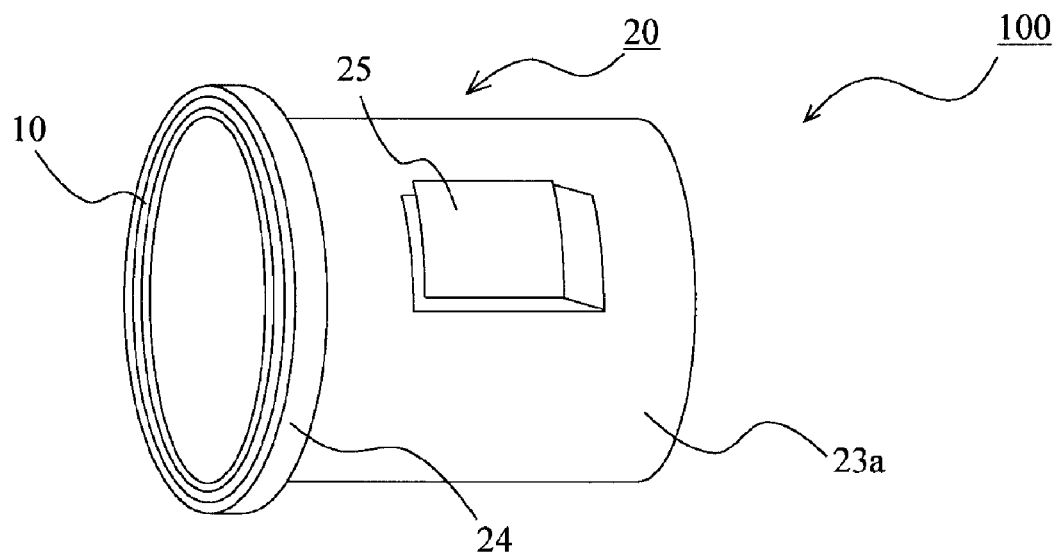
FIG. 5 is a schematic perspective view of the sealing device according to Example 2 of the present disclosure.
Figure 6:
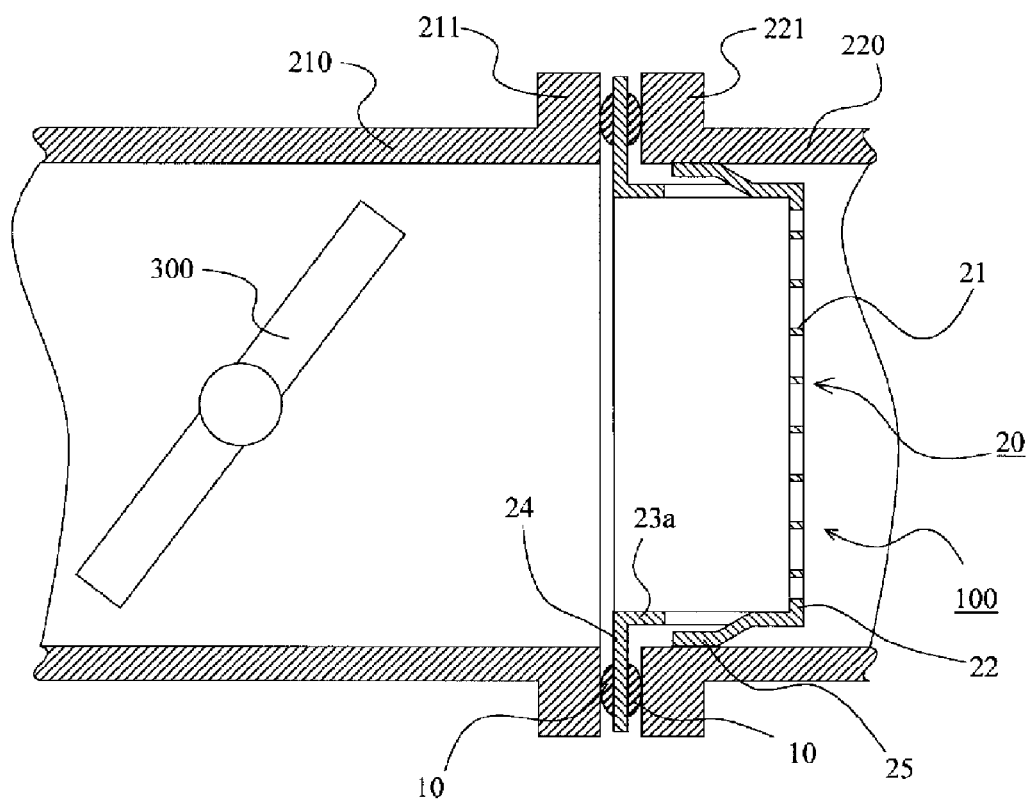
FIG. 6 is a schematic cross-sectional view showing a state in which the sealing device according to Example 2 of the present disclosure is attached to the intake pipe.

Example 2 of the present disclosure is shown in FIGS. 4 to 6. In above described Example 1, the configuration is described in which the tubular portion of the intake noise reduction portion is fitted into the inner circumferential surface of the pipe. In the present example, on the other hand, a configuration is described in which an elastically deforming portion is provided on the outer circumferential surface side of the tubular portion and this elastically deforming portion comes into close contact with the inner circumferential surface of the pipe. Other components and their effects are the same as those in Example 1, and hence the same components are denoted by the same reference numerals and the explanations thereof are omitted.

In the sealing device according to Example 1 described above, the configuration is employed in which the tubular portion (the cylindrical portion 23) of the intake noise reduction portion 20 is fitted into the inner circumferential surface of the pipe (the second pipe 220). Accordingly, unless the dimensional accuracies of the outer diameter of the cylindrical portion 23 and the inner diameter of the second pipe 220 are set high, spaces that are created therebetween might cause backlash or might increase the fitting force applied to the cylindrical portion 23 while fitting too high. Particularly, in a case where the backlash is caused, it would cause unusual noise. In the present example, therefore, a configuration is described that is capable of resolving these problems.

FIG. 4 is a front view of a sealing device according to Example 2 of the present disclosure. FIG. 5 is a schematic perspective view of the sealing device according to Example 2 of the present disclosure. Note that FIG. 5 only shows one elastically deforming portion. FIG. 6 is a schematic cross-sectional view showing a state in which the sealing device according to Example 2 of the present disclosure is attached to the intake pipe. Note that the view of the sealing device shown in FIG. 6 is a cross-sectional view taken along AA of FIG. 4.

<Sealing Device>

As with the sealing device of Example 1, the sealing device 100 according to the present example is equipped in an intake pipe provided to an intake manifold and the like. The configuration and the like of the intake pipe are those that have already been described in Example 1; thus, descriptions thereof are omitted accordingly. Also, as with the sealing device of Example 1, the sealing device 100 according to the present example is integrally provided with the gasket portion 10 for sealing the space between the end surface of the first pipe 210 and the end surface of the second pipe 220, and the intake noise reduction portion 20 for reducing intake noise. The gasket portion 10 is composed from an elastic body (e.g., an elastomer such as rubber and TPE).

<Intake Noise Reduction Portion>

The intake noise reduction portion 20 is configured from a flow-guiding net portion 21, an annular frame body portion 22 for supporting the flow-guiding net portion 21, a cylindrical portion 23a as a tubular portion, an elastically deforming portion 25 provided on the outer circumferential surface side of the cylindrical portion 23a, and a flange portion 24. Since the flow-guiding net portion 21, the frame body portion 22, and the flange portion 24 have the same configurations as those described in Example 1; thus, descriptions thereof are omitted accordingly.

The cylindrical portion 23a according to the present example extends in the direction in which the pipe extends from the frame body portion 22 (the axial direction). In the present example, an outer diameter of the cylindrical portion 23a is set to be smaller than an inner diameter of the second pipe 220. Accordingly, an annular space is formed between an outer circumferential surface of the cylindrical portion 23a and an inner circumferential surface of the second pipe 220. On the outer circumferential surface side of the cylindrical portion 23a, there is provided an elastically deforming portion 25 that is in close contact with the inner circumferential surface of the second pipe 220, and that supports the cylindrical portion 23a in its positioned state within the second pipe 220 by elastic repulsive force thereof. The elastically deforming portion 25 is provided in such a manner as to project toward the outer circumferential surface side of the cylindrical portion 23a. In the present example, the elastically deforming portion 25 is provided at a total of four places that are equally spaced in a circumferential direction. The elastically deforming portion 25 is configured such that its portion on a flow-guiding net portion 21 side thereof is connected to the cylindrical portion 23a, it extends toward the flange portion 24 in the axial direction, and its end portion on a flange portion 24 side thereof is a free end. Accordingly, when inserting the cylindrical portion 23a into the second pipe 220, the free end of the elastically deforming portion 25 does not get caught by the inner circumferential surface of the second pipe 220, thereby enabling a smooth insertion.

In the present example as well, the gasket portion 10 is provided on both surfaces of the flange portion 24 in the intake noise reduction portion 20. The gasket portion 10 has already been described in Example 1; thus, description thereof is omitted accordingly.

According to the sealing device 100 of the present example that is configured as described above, it is possible to achieve the same effects as those of the sealing device 100 according to Example 1 as already described. In addition, the present example employs the configuration in which the annular space is formed between the outer circumferential surface of the cylindrical portion 23a and the inner circumferential surface of the second pipe 220, and the elastically deforming portion 25 provided on the outer circumferential surface side of the cylindrical portion 23a is in close contact with the inner circumferential surface of the second pipe 220. Moreover, the present example employs the configuration in which the elastic repulsive force of the elastically deforming portion 25 supports the cylindrical portion 23a in its positioned state within the second pipe 220. Therefore, the dimensional accuracies of the outer diameter of the cylindrical portion 23a and the inner diameter of the second pipe 220 do not have to be made too high. Furthermore, the present example can suppress the generation of unusual noise that is caused by backlash between the inner circumferential surface of the second pipe 220 and the intake noise reduction portion 20.

Example 3

Figure 7:
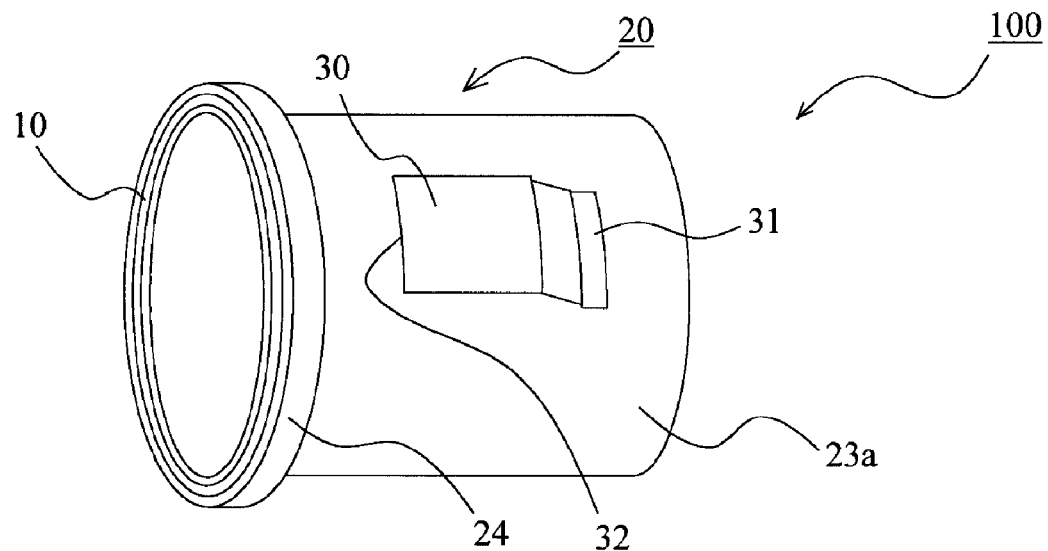
FIG. 7 is a schematic perspective view of a sealing device according to Example 3 of the present disclosure.
Figure 8:
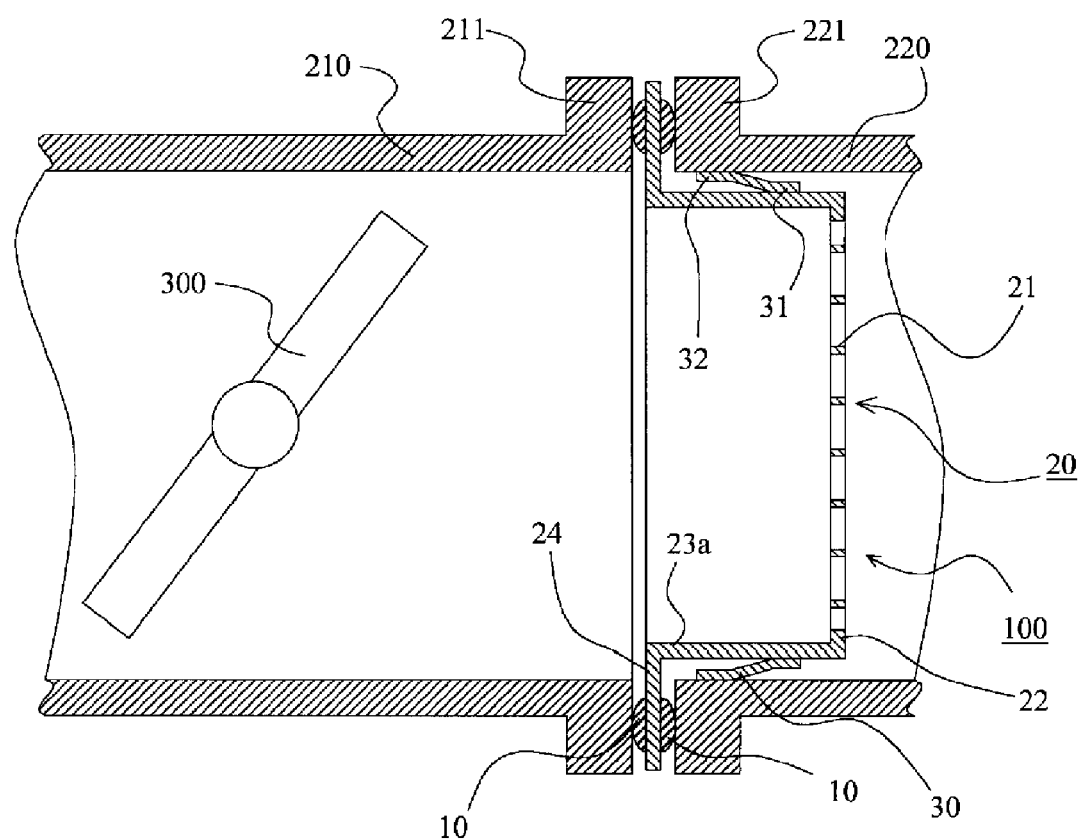
FIG. 8 is a schematic cross-sectional view showing a state in which the sealing device according to Example 3 of the present disclosure is attached to the intake pipe.

Example 3 of the present disclosure is shown in FIGS. 7 and 8. In above described Example 2, the configuration is described in which the elastically deforming portion and the tubular portion are composed integrally. In the present example, on the other hand, a configuration is described in which an elastically deforming portion that is composed separately from a tubular portion is fitted in the tubular portion. Other components and their effects are the same as those in Example 2, and hence the same components are denoted by the same reference numerals and the explanations thereof are omitted.

FIG. 7 is a schematic perspective view of a sealing device according to Example 3 of the present disclosure. Note that FIG. 7 only shows one elastically deforming portion. FIG. 8 is a schematic cross-sectional view showing a state in which the sealing device according to Example 3 of the present disclosure is attached to the intake pipe. In the present example, only the configuration relating to the elastically deforming portion is different from that in the case of Example 2, whereas other configurations are the same as those described in Example 2. Accordingly, the configuration relating to the elastically deforming portion will be described.

A cylindrical portion 23a according to the present example also extends in a direction in which the pipe extends from a frame body portion 22 (the axial direction). In the present example as well, an outer diameter of the cylindrical portion 23a is set to be smaller than an inner diameter of the second pipe 220. Accordingly, an annular space is formed between an outer circumferential surface of the cylindrical portion 23a and an inner circumferential surface of the second pipe 220. On the outer circumferential surface side of the cylindrical portion 23a, there is provided an elastically deforming portion 30 that is in close contact with the inner circumferential surface of the second pipe 220, and that supports the cylindrical portion 23a in its positioned state within the second pipe 220 by elastic repulsive force thereof. The elastically deforming portion 30 according to the present example is fitted on the outer circumferential surface of the cylindrical portion 23a by welding or adhering with adhesives. Note that also in the present example, the elastically deforming portion 30 is provided at a total of four places that are equally spaced in a circumferential direction.

In the present example, the elastically deforming portion 30 is provided to the cylindrical portion 23a in such a manner that one end portion 31 thereof is fitted to the cylindrical portion 23a so that another end portion 32 becomes a free end. Accordingly, similarly to the case of Example 2, in the present example as well, the elastically deforming portion 30 is configured such that its portion on a flow-guiding net portion 21 side thereof is connected to the cylindrical portion 23a, that it extends toward the flange portion 24 in the axial direction, and that its end portion on a flange portion 24 side thereof (another end portion 32) is a free end.

According to the configuration as described above, also in the sealing device 100 of the present example, it is possible to achieve the same effects as those of Example 2.

Example 4

Figure 9:
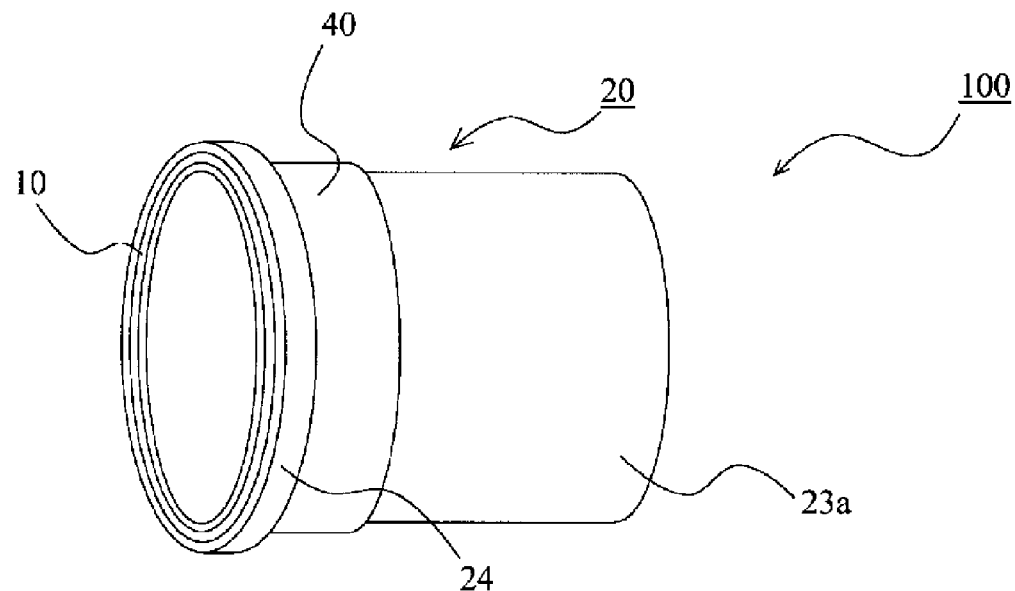
FIG. 9 is a schematic perspective view of a sealing device according to Example 4 of the present disclosure.
Figure 10:
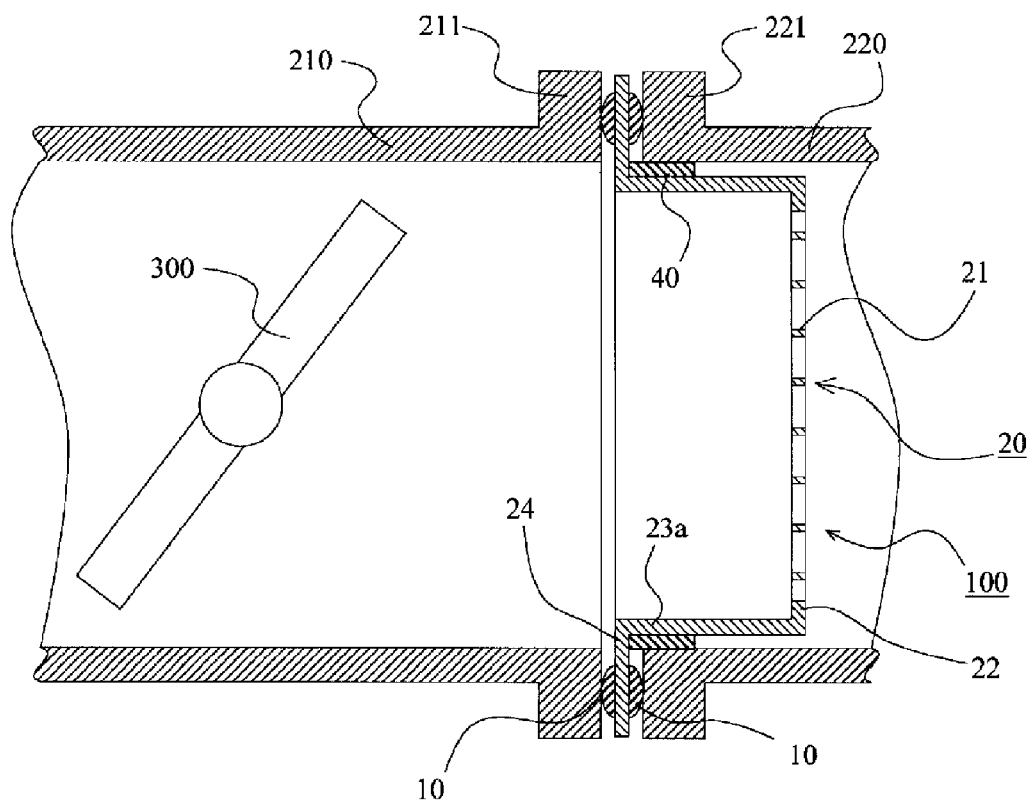
FIG. 10 is a schematic cross-sectional view showing a state in which the sealing device according to Example 4 of the present disclosure is attached to the intake pipe.

Example 4 of the present disclosure is shown in FIGS. 9 and 10. In above described Example 2, the configuration is described in which the elastically deforming portion and the tubular portion are composed integrally. In the present example, on the other hand, a configuration is described in which an annular elastically deforming portion that is composed separately from a tubular portion is fitted in the tubular portion. Other components and their effects are the same as those in Example 2, and hence the same components are denoted by the same reference numerals and the explanations thereof are omitted.

FIG. 9 is a schematic perspective view of a sealing device according to Example 4 of the present disclosure. FIG. 10 is a schematic cross-sectional view showing a state in which the sealing device according to Example 4 of the present disclosure is attached to the intake pipe. In the present example as well, only the configuration relating to the elastically deforming portion is different from that in the case of Example 2, whereas other configurations are the same as those described in Example 2. Accordingly, the configuration relating to the elastically deforming portion will be described.

A cylindrical portion 23a according to the present example also extends in a direction in which the pipe extends from a frame body portion 22 (the axial direction). In the present example as well, an outer diameter of the cylindrical portion 23a is set to be smaller than an inner diameter of the second pipe 220. Accordingly, an annular space is formed between an outer circumferential surface of the cylindrical portion 23a and an inner circumferential surface of the second pipe 220. On the outer circumferential surface side of the cylindrical portion 23a, there is provided an elastically deforming portion 40 that is in close contact with the inner circumferential surface of the second pipe 220, and that supports the cylindrical portion 23a in its positioned state within the second pipe 220 by elastic repulsive force thereof. The elastically deforming portion 40 according to the present example is fitted on the outer circumferential surface of the cylindrical portion 23a by being mounted on the outer circumferential surface of the cylindrical portion 23a.

The elastically deforming portion 40 according to the present example is configured from an annular member that is made of an elastic body such as rubber. By mounting the this annular member onto the outer circumferential surface of the cylindrical portion 23a, the elastically deforming portion 40 can be provided to the cylindrical portion 23a.

According to the configuration as described above, also in the sealing device 100 of the present example, it is possible to achieve the same effects as those of Example 2.

(Modification of Sealing Device)

Figure 11:
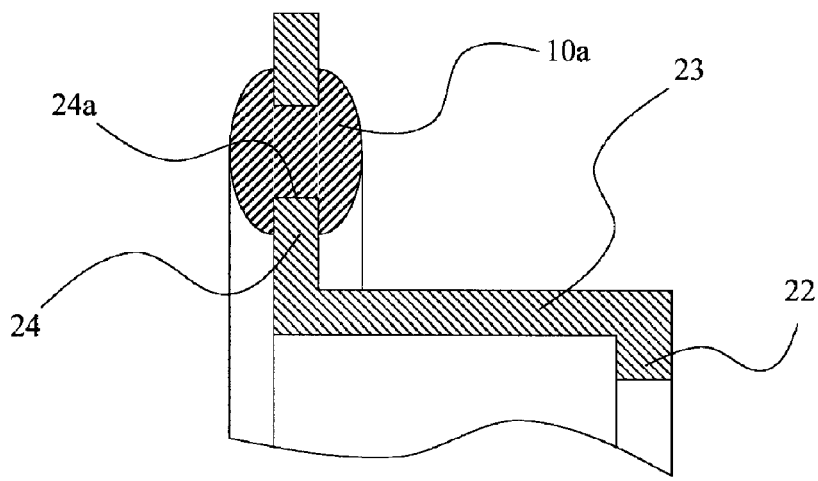
FIG. 11 is a part of a schematic cross-sectional view of a sealing device according to a modification of the present disclosure.

Modification of the sealing device 100 will be described with reference to FIG. 11. In each of the above described examples, the configuration is described in which the gasket portions 10 are individually provided on both surfaces of the flange portion 24 in the intake noise reduction portion 20. In cases where the individual gasket portions 10 are integrally molded on both surfaces of the planar shaped flange portion 24, integrally molding needs to be done under the condition in which adhesives are applied to the flange portion 24 in order to fix the gasket portions 10 to the flange portion 24. In the light of the above, by providing a through-hole 24a in the flange portion 24, as shown in FIG. 11, a gasket portion 10a can be fixed to the flange portion 24 even without applying the adhesives when integrally molding the gasket portion 10a. Accordingly, the gasket portions 10a can be provided on both surfaces of the flange portion 24 at the same time. Note that it is preferable that the through-hole 24a be provided at a plurality of locations in a circumferential direction. In addition, this modification can be employed in any of the above described examples.

(Modification of Intake Noise Reduction Portion)

Figure 12:
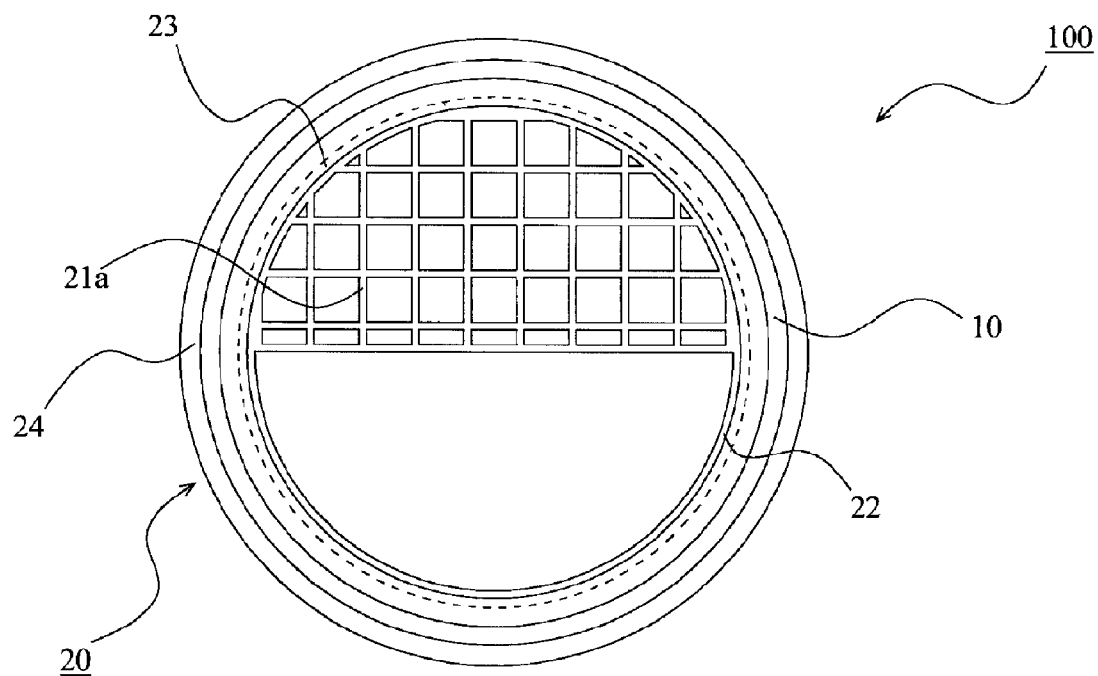
FIG. 12 is a front view of the intake noise reduction portion according to the modification of the present disclosure.

Modification of the intake noise reduction portion will be described with reference to FIG. 12. In the intake noise reduction portion 20 shown in each of the above described examples, the flow-guiding net portion 21 is provided over the entire region within the frame body portion 22. However, as the flow-guiding net portion does not need to be provided over the entire region within the frame body portion 22, it may be provided to necessary regions depending on the usage environment. Accordingly, as shown in FIG. 12 as an example, a configuration may be employed in which a flow-guiding net portion 21a is provided only in a semicircular region within the region of the frame body portion 22. Note that the configurations of the frame body portion 22, cylindrical portions 23, 23a and the flange portion 24 are the same as those described in each of the above examples. In addition, this modification can be employed in any of the above described examples.

(Others)

As for the material of the intake noise reduction portion 20 described in each of the above examples, a rubber material can be employed as appropriate other than a metal and resin. Note that even in a case where an elastic body such as rubber is employed as a material of the intake noise reduction portion 20, it is technically significant to separately compose the gasket portion 10 and the intake noise reduction portion 20 because the material required for the gasket portion 10 and the material required for the intake noise reduction portion 20 are different in terms of functions.

In each of the above examples, the cases have been described where the cylindrical portion 23 (or the cylindrical portion 23a provided with the elastically deforming portions on the outer circumferential surface side) of the intake noise reduction portion 20 is fitted into the inner circumferential surface of the second pipe 220. However, the cylindrical portions 23, 23a may be fitted into an inner circumferential surface of the first pipe 210. Specifically, in FIGS. 3, 6, 8 and 10, the sealing device 100 may be installed with its left and right sides reversed. Accordingly, the distance from the throttle valve 300 to the flow-guiding net portion 21 can be adjusted also by the direction of the installment of the sealing device 100.

In addition, in each of the above examples, the cases have been described where the tubular portion of the intake noise reduction portion 20 is configured from the cylindrical portion 23, 23a. This is because the intake pipe has a cylindrical shape. However, the intake pipes are not limited to cylindrical, and there are various intake pipes with their cross sections perpendicular to a central axis line of the intake passage being ellipsoidal or rectangular. Accordingly, as for the tubular portion of the intake noise reduction portion 20, its shape can be determined in accordance with the shape of the intake pipe.

Reference Example (Summary)

A sealing device according to a reference example of the present disclosure is a sealing device that includes a gasket portion made of an elastic body for sealing a space between an end surface of one of two pipes configuring an intake pipe and an end surface of another of the two pipes, and an intake noise reduction portion for reducing intake noise, wherein the gasket portion includes: a gasket body portion for sealing seals the space between the end surface of the one pipe and the end surface of the other pipe by being sandwiched therebetween; and a tubular portion that is coupled to the gasket body portion, and is fitted into an inner circumferential surface of either one of the one pipe and the other pipe, wherein the intake noise reduction portion includes: a main body portion (or a flow-guiding net portion for guiding a gas flowing in the intake pipe) for reducing intake noise; an annular frame body portion for supporting the main body portion (or the flow-guiding net portion); a fitted portion that extends from the frame body portion in an axial direction, and is fitted to the tubular portion of the gasket portion.

According to the sealing device of the reference example of the present disclosure, because the gasket portion and the intake noise reduction portion are provided, the sealing device can exert not only a sealing function but also an intake noise reducing function. The position for disposing the main body portion in the intake pipe can be adjusted by setting the length of the tubular portion of the gasket portion and the length of the fitted portion of the intake noise reduction portion. Therefore, a distance between a throttle valve and the main body portion can be adjusted, and the effect of reducing intake noise can sufficiently be exerted by disposing the main body portion in a position that produces a high intake noise reduction effect. In addition, because the tubular portion of the gasket portion is fitted into the inner circumferential surface of either one of the two pipes configuring the intake pipe, the generation of unusual noise due to the resonance can be suppressed at this fitted portion. And in the case where the main body portion is configured from the flow-guiding net portion, it becomes possible to suppress the generation of unusual noise by guiding the gas flow.

Furthermore, because the tubular portion of the gasket portion is fitted into the inner circumferential surface of either one of the two pipes configuring the intake pipe, an installation of the sealing device to the intake pipe can be done with ease, and the posture of the gasket portion can be made stable.

Specific Example

Figure 13:
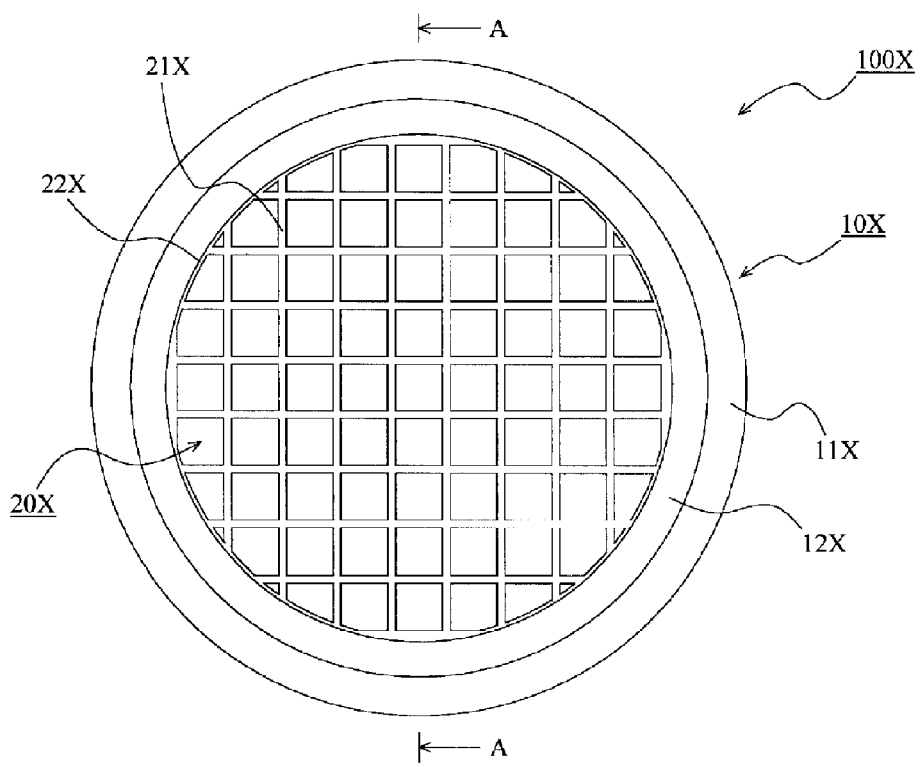
FIG. 13 is a front view of a sealing device according to a reference example of the present disclosure.
Figure 14:
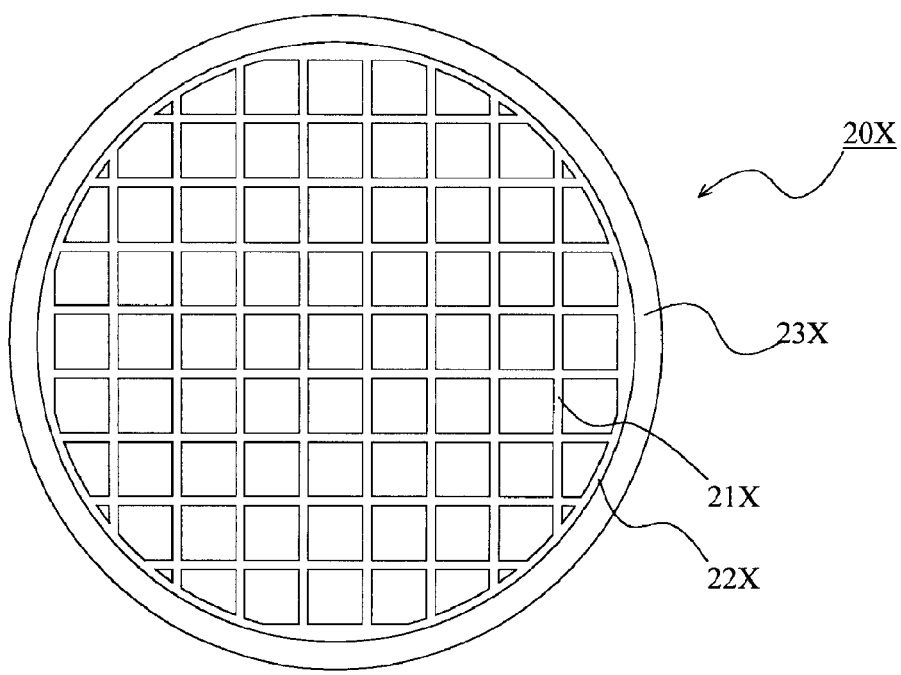
FIG. 14 is a front view of an intake noise reduction portion according to the reference example of the present disclosure.
Figure 15:
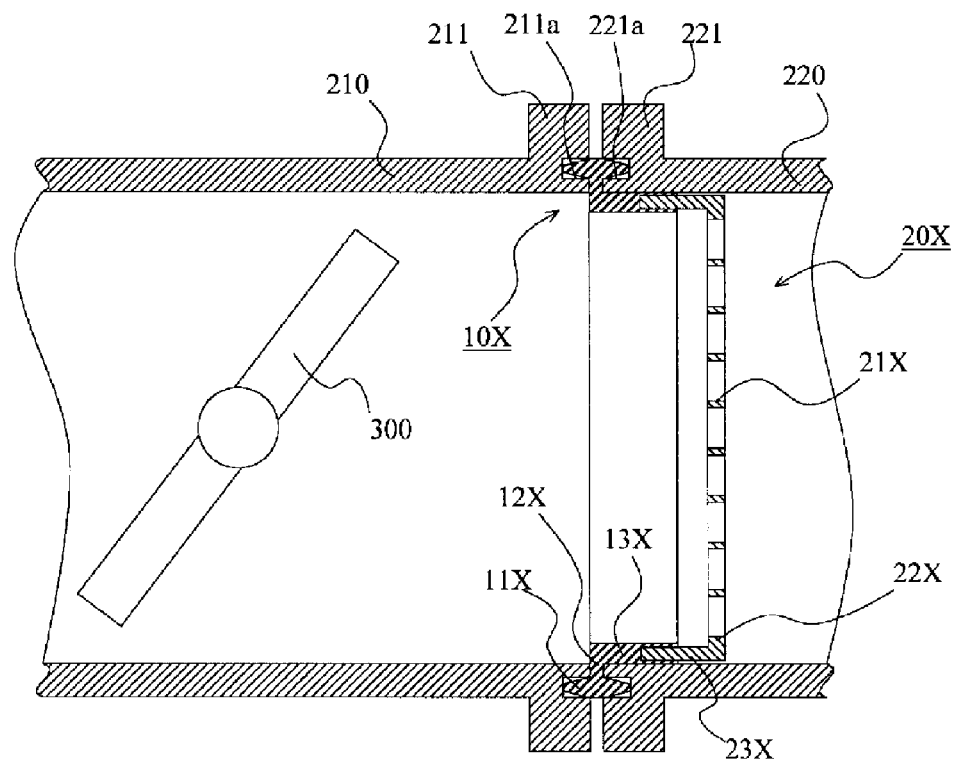
FIG. 15 is a schematic cross-sectional view showing a state in which the sealing device according to the reference example of the present disclosure is attached to the intake pipe.

A sealing device according to a reference example of the present disclosure is described with reference to FIGS. 13 to 15. FIG. 13 is a front view of a sealing device according to the reference example of the present disclosure. FIG. 14 is a front view of an intake noise reduction portion according to the reference example of the present disclosure. Specifically, FIG. 14 shows a state of the sealing device shown in FIG. 13 prior to be integrally molded with a gasket portion. FIG. 15 is a schematic cross-sectional view showing a state in which the sealing device according to the reference example of the present disclosure is attached to the intake pipe. Note that the view of the sealing device shown in FIG. 15 is a cross-sectional view taken along AA of FIG. 13.

<Sealing Device>

A sealing device 100X according to the reference example is equipped in an intake pipe provided to an intake manifold and the like. That is, the sealing device 100X according to the present example is equipped in a joint portion between two pipes configuring the intake pipe. For convenience of explanation, these two pipes are referred to hereinafter as the first pipe 210 and the second pipe 220. The sealing device 100X is disposed on a downstream side of a throttle valve 300 provided in the intake pipe in a direction of a gas flow.

An end portion of the first pipe 210 and an end portion of the second pipe 220 are provided with flange portions 211, 221, respectively. The first pipe 210 and the second pipe 220 are coupled to each other by placing the flange portion 211 and the flange portion 221 on top of each other and fixing these flange portions with a known fixture (not shown) such as a bolt. The first pipe 210 and the second pipe 220 are each in a shape of a cylinder having a circular cross section perpendicular to the central axial line of an intake passage (a cross section perpendicular to a direction of extension of the pipes). Hereinafter, the term "axial direction" denotes a direction of the central axial line of the intake passage.

The sealing device 100X is provided integrally with a gasket portion 10X for sealing a space between an end surface of the first pipe 210 and an end surface of the second pipe 220, and an intake noise reduction portion 20X for reducing intake noise. The gasket portion 10X is composed from an elastic body such as various rubber materials, resin elastomers and the like. In addition, for the intake noise reduction portion 20X, s metal, resin or an elastic body such as rubber may be used.

<Gasket Portion>

The gasket portion 10X is configured from a gasket body portion 11X and a cylindrical portion 13X as a tubular portion that is coupled to the gasket body portion 11X via a coupled portion 12X. The gasket body portion 11X seals the space between the end surface of the first pipe 210 and the end surface of the second pipe 220 by being sandwiched therebetween. More specifically, the gasket body portion 11X is mounted into both of an annular groove 211a provided on the end surface of the first pipe 210 and an annular groove 221a provided on the end surface of the second pipe 220, and is sandwiched so as to be compressed by bottom surfaces of those annular grooves. Accordingly, the space between those end surfaces is sealed. In addition, the cylindrical portion 13X is configured so as to be fitted into an inner circumferential surface of the second pipe 220. Specifically, the outer diameter of the cylindrical portion 13X is set to be slightly larger than the inner diameter of the second pipe 220. Accordingly, the cylindrical portion 13X is fitted into the inner circumferential surface of the second pipe 220 by inserting the cylindrical portion 13X into the second pipe 220.

<Intake Noise Reduction Portion>

The intake noise reduction portion 20X is configured from a flow-guiding net portion 21X as a main body portion, an annular frame body portion 22X for supporting the flow-guiding net portion 21X, and a fitted portion 23X that extends from the frame body portion 22X in the axial direction, and is fitted to the cylindrical portion 13X of the gasket portion 10X. The flow-guiding net portion 21X functions to guide a gas flowing inside the intake pipe and is provided over the entire region within the frame body portion 22X in the reference example. In addition, the fitted portion 23X of the reference example is provided so as to extend from the entire region of the frame body portion 22X in the axial direction. Accordingly, the fitted portion 23X has a cylindrical shape.

Note that the sealing device 100X that is formed integrally with the gasket portion 10X and the intake noise reduction portion 20X can be obtained by insert-molding the gasket portion 10X using the intake noise reduction portion 20X as an insert.

<Advantages of Sealing Device According to Reference Example>

According to the sealing device 100X of the reference example, because the gasket portion 10X and the intake noise reduction portion 20X are provided, the sealing device 100X can exert not only a sealing function but also an intake noise reducing function.

In addition, because the intake noise reduction portion 20X includes the flow-guiding net portion 21X, it can suppress the generation of unusual noise by guiding the gas flow. In so doing, the position for disposing the flow-guiding net portion 21X in the intake pipe can be adjusted by setting the length of the cylindrical portion 13X (the length in the axial direction) of the gasket portion 10X and the length of the fitted portion 23X (the length in the axial direction) of the intake noise reduction portion 20X. Consequently, the distance between the throttle valve 300 and the flow-guiding net portion 21X can be adjusted. Therefore, by disposing the flow-guiding net portion 21X in a position that produces a high intake noise reduction effect, the effect of reducing intake noise can sufficiently be exerted. In other words, according to a conventional example, the position of the flow-guiding net is determined in the position where the two pipes are coupled to each other, making it impossible to adjust the distance between the throttle valve and the flow-guiding net. To the contrary, according to the reference example, the position of the flow-guiding net portion 21X can be adjusted as described above, thereby sufficiently exerting the effect of suppressing the generation of unusual noise by means of the flow-guiding net portion 21X.

In the reference example, the cylindrical portion 13X of the gasket portion 10X is fitted into the inner circumferential surface of the second pipe 220. Thus, the generation of unusual noise due to the resonance can be suppressed at this fitted portion. Note that, in the reference example, both of an inner circumferential surface side and an outer circumferential surface side of the fitted portion 23X of the intake noise reduction portion 20X are covered by a part of the gasket portion 10X (a distal end portion extending from the cylindrical portion 13X). Accordingly, an annular space may be formed between the outer circumferential surface of the fitted portion 23X and the inner circumferential surface of the second pipe 220. However, since this space is minute, the outer circumferential surface of the fitted portion 23X can suppress the generation of unusual noise due to the resonance at this portion by making contact to the inner circumferential surface of the second pipe 220.

Moreover, because the cylindrical portion 23X of the gasket portion 10X is fitted into the inner circumferential surface of the second pipe 220, the sealing device 100X can be held stably with respect to the second pipe 220 by this fitted portion. Therefore, an installation of the sealing device 100X into the intake pipe can be done with ease, and the posture of the gasket portion 10X can be made stable. Note that, because the posture of the gasket portion 10X is stabilized, its sealing performance can be exerted stably.

As described thus far, according to the sealing device 100X of the reference example, it is possible to not only suppress the generation of unusual noise by guiding the gas flow but also suppressing the generation of unusual noise caused by resonance between the gas flow and the pipe. In addition, the sealing device 100X is superior in installation workability. Moreover, the sealing device 100X is superior in stability of the posture of the gasket portion 10X.

(Modification of Intake Noise Reduction Portion)

Figure 16:
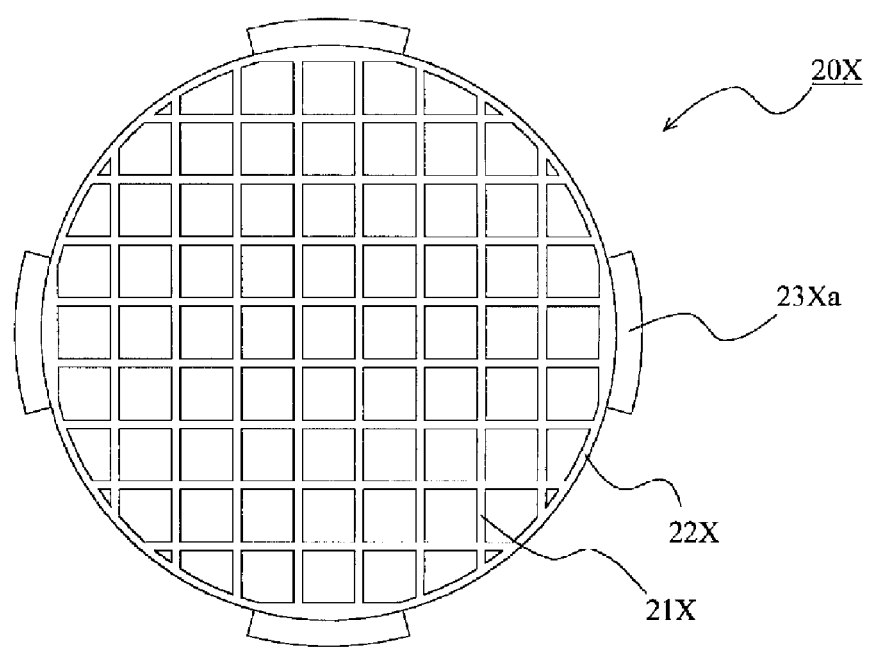
FIG. 16 is a front view of an intake noise reduction portion according to Modification 1 of the reference example of the present disclosure.

A modification 1 of the intake noise reduction portion is described with reference to FIG. 16. In the intake noise reduction portion 20X described in the reference example above, the fitted portion 23X is provided so as to extend from the entire region of the frame body portion 22X in the axial direction. That is, the fitted portion 23X has a cylindrical shape. However, the shape of this fitted portion is not limited as long as it is configured such that the intake noise reduction portion 20X is sufficiently fitted against the gasket portion 10X. Therefore, as shown in FIG. 16 as an example, a configuration may be employed in which a fitted portion 23Xa is provided on the frame body portion 22X partly in a circumferential direction. In the illustrated example, the configuration is shown in which the fitted portions 23Xa are provided at four places at every 90 degrees. Note that the configurations of the flow-guiding net portion 21X and the frame body portion 22X are the same as those described in the above reference example.

Figure 17:
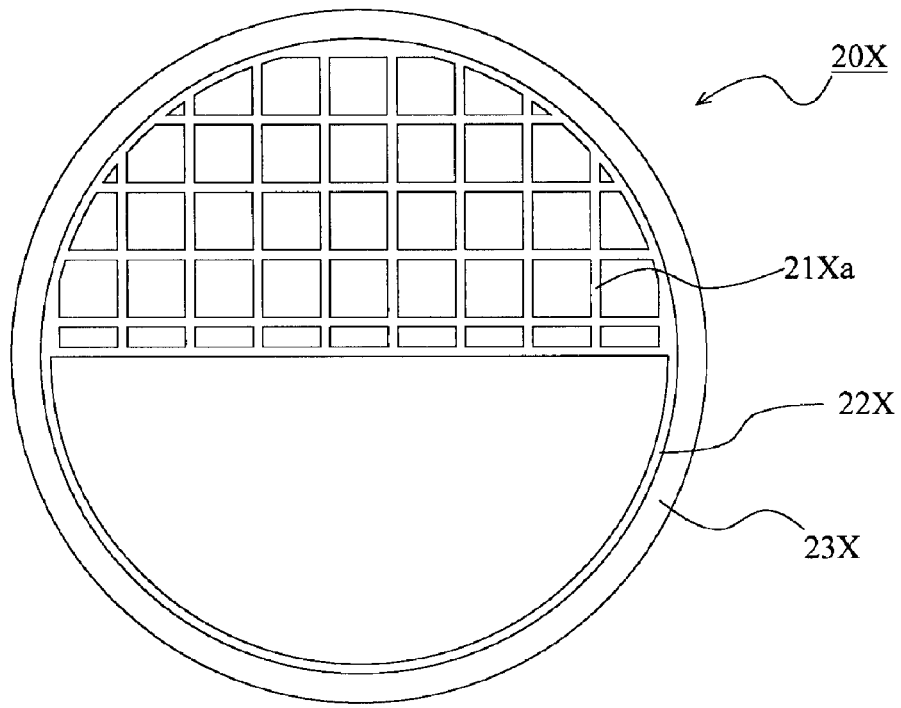
FIG. 17 is a front view of an intake noise reduction portion according to Modification 2 of the reference example of the present disclosure.

A modification 2 of the intake noise reduction portion is described with reference to FIG. 17. In the intake noise reduction portion 20X described in the above reference example, the flow-guiding net portion 21X is provided over the entire region within the frame body portion 22X. However, as the flow-guiding net portion does not need to be provided over the entire region within the frame body portion 22X, it may be provided to necessary regions depending on the usage environment. Accordingly, as shown in FIG. 17 as an example, a configuration may be employed in which a flow-guiding net portion 21Xa is provided only in a semicircular region within the region of the frame body portion 22X. Note that the configurations of the frame body portion 22X and the fitted portion 23X are the same as those described in each of the above examples.

In the above reference examples, the cases have been described where the cylindrical portion 13X of the gasket portion 10X is fitted into the inner circumferential surface of the second pipe 220. However, the cylindrical portion 13X may be fitted into an inner circumferential surface of the first pipe 210. Specifically, in FIG. 15, the sealing device 100X may be installed with its left and right sides reversed. Accordingly, the distance from the throttle valve 300 to the flow-guiding net portion 21X can be adjusted also by the direction of the installment of the sealing device 100X.

In addition, in each of the above examples, the cases have been described where the tubular portion of the gasket portion 10X is configured from the cylindrical portion 13X. This is because the intake pipe has a cylindrical shape. However, the intake pipes are not limited to cylindrical, and there are various intake pipes with their cross sections perpendicular to a central axis line of the intake passage being ellipsoidal or rectangular. Accordingly, as for the tubular portion of the gasket portion 10X, its shape can be determined in accordance with the shape of the intake pipe.

In addition, as described above, since the material of the intake noise reduction portion 20X is not limited to a metal or resin, an elastic body such as rubber may be used. Even in a case where an elastic body such as rubber is employed as a material of the intake noise reduction portion 20X, it is technically significant to separately compose the gasket portion 10X and the intake noise reduction portion 20X because the material required for the gasket portion 10X and the material required for the intake noise reduction portion 20X are different in terms of functions. Moreover, separate composing also has a technical significance in terms of productivity.

Example 5

Figure 18:
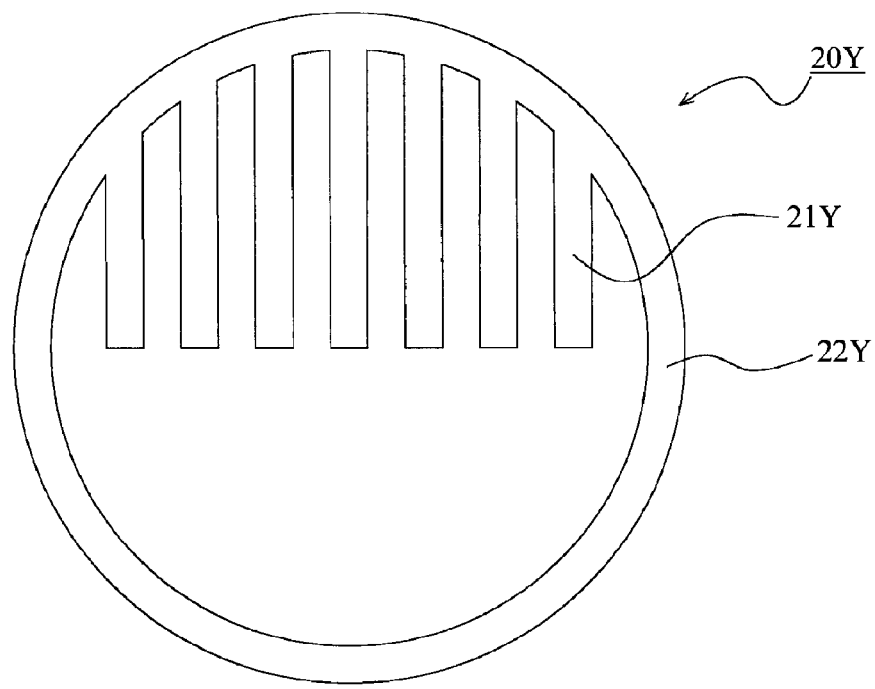
FIG. 18 is a front view showing a main body portion of an intake noise reduction portion according to Example 5 of the present disclosure.

Example 5 of the present disclosure is shown in FIG. 18. In each of the above described examples and reference example, the configuration is described in which the main body portion of the intake noise reduction portion is configured from the flow-guiding net portion. In the present example, a configuration is described in which a main body portion of an intake noise reduction portion is configured from a plurality of suspended portions. Note that the configuration regarding the main body portion of the intake noise reduction portion that is described in the present example can be employed in any of the above described examples and reference example. Specifically, the plurality of suspended portions described in the present example can be employed in any of the above described examples and reference example as an alternative to the flow-guiding net portion thereof. Therefore, in the present example, with respect to the configurations other than that of the intake noise reduction portion, descriptions thereof are omitted.

FIG. 18 is a front view showing a main body portion of an intake noise reduction portion according to Example 5 of the present disclosure. In FIG. 18, only a main body portion and a frame body portion of the intake noise reduction portion are shown.

In an intake noise reduction portion 20Y of the present example, a plurality of suspended portions 21Y that block a part of an intake passage and reduce the intake noise are provided in an inner side of a frame body portion 22Y. That is, the main body portion of the intake noise reduction portion 20Y of the present example is configured from the plurality of suspended portions 21Y that are configured to sway in response to a gas flow. In addition, an outer shape of the frame body portion 22Y is circular, and in the vicinity of the center, a circular hole (circular except for a part provided with the suspended portions 21Y) is formed along the intake passage. The plurality of suspended portions 21Y are provided so as to be placed in an upper semicircular region within the circular hole. Therefore, as for a lower semicircular region within the circular hole, the intake passage is not blocked.

The plurality of suspended portions 21Y are configured to sway in response to the gas flowing through the intake passage. That is, when the gas flows through the intake passage, the suspended portions 21Y elastically deform towards a downstream side of a flow direction of the gas. Then, a part of the gas flew from an upstream side of the sealing device hits the plurality of the suspended portions 21Y and then flows towards the downstream side. Accordingly, in the vicinity of the plurality of suspended portions 21Y, turbulence is formed in the gas flow.

<Advantages of Present Example>

According to the intake noise reduction portion 20Y of the present example, the gas flow is dispersed by the plurality of suspended portions 21Y. Accordingly, in a case where it is applied to an intake manifold, a flow of big mass of air that is created at the beginning of a throttle opening can be dispersed, thereby making it possible to suppress the generation of unusual noise such as resonance. In addition, in a case where the plurality of suspended portions 21Y are made of a rubber-like elastic body, its damping performance can damp the energy that generates noise. Owing to the combination of these effects, intake noise can be reduced effectively.

In addition, the plurality of suspended portions 21Y deform in a direction of the gas flow in response to the gas flow, thereby suppressing the inflow resistance of the gas. Thus, the pressure loss of the gas to be suctioned does not increase.

Example 6

Figure 19:
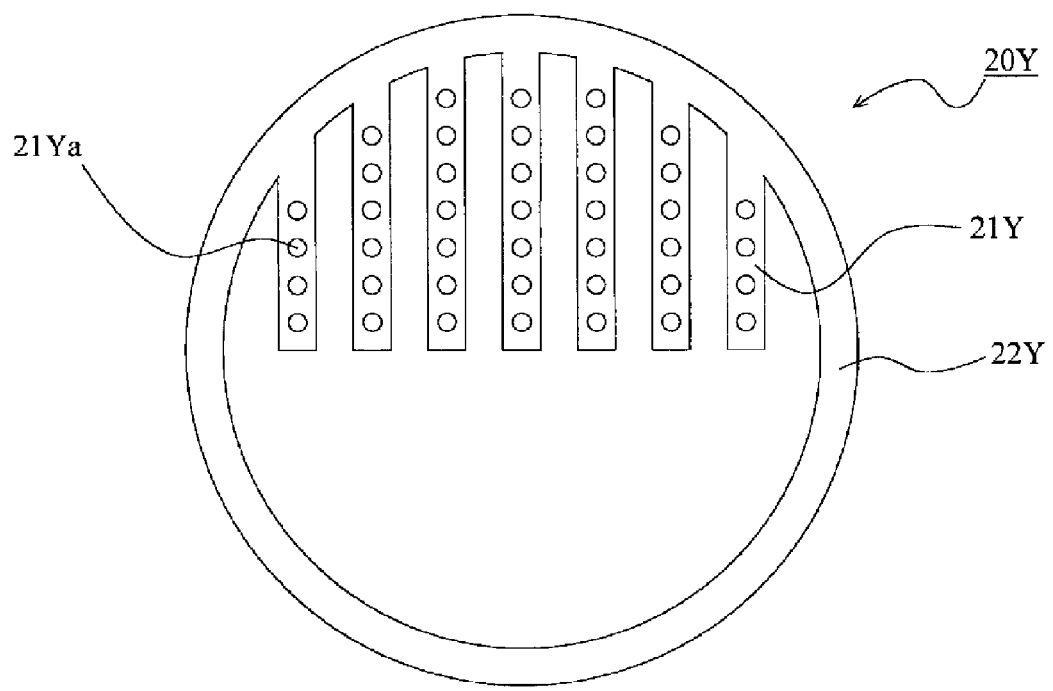
FIG. 19 is a front view showing a main body portion of an intake noise reduction portion according to Example 6 of the present disclosure.

Example 6 of the present disclosure is shown in FIG. 19. In the present example, a configuration is described in which a plurality of through holes are provided to the suspended portions of the intake noise reduction portion as described in Example 5. Other components and their effects are the same as those in Example 6, and hence the same components are denoted by the same reference numerals and the explanations thereof are omitted.

FIG. 19 is a front view showing a main body portion of an intake noise reduction portion according to Example 6 of the present disclosure. In FIG. 19, only a main body portion and a frame body portion of the intake noise reduction portion are shown.

As shown in the drawing, in an intake noise reduction portion 20Y according to the present example, a plurality of through-holes 21Ya are provided to each of a plurality of suspended portions 21Y. With these, an inflow resistance of the gas can be further lowered, thereby making it possible to further lower the pressure loss of the gas to be suctioned.

Example 7

Figure 20:
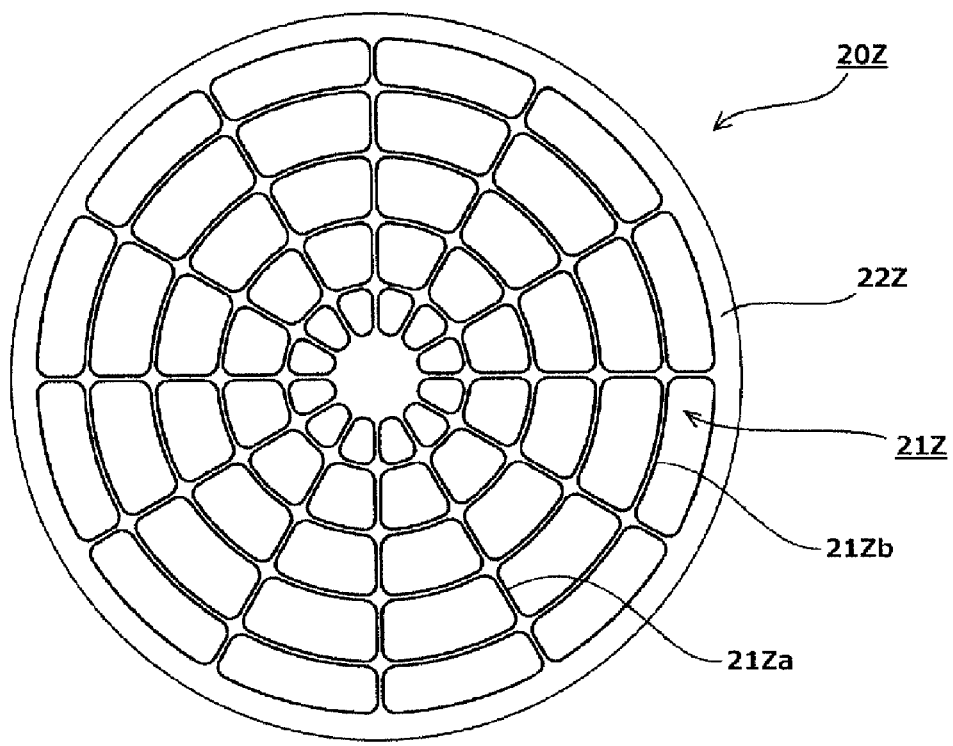
FIG. 20 is a front view showing a main body portion of an intake noise reduction portion according to Example 7 of the present disclosure.

Example 7 of the present disclosure is shown in FIG. 20. In each of above described Examples 1 to 4 and the reference example, the configuration is described in which the flow-guiding net portion of the intake noise reduction portion is configured from a grid like mesh, and the size of each mesh is configured to be substantially equal. In the present example, a configuration is described in which a flow-guiding net portion is configured such that a mesh thereof is fine in a vicinity of a center of a flow passage in the intake pipe and becomes coarser with distance from the vicinity of the center. Note that the configuration regarding a main body portion of the intake noise reduction portion (flow-guiding net portion) that is described in the present example can be employed in any of above described Examples 1 to 4 and the reference example. Specifically, the flow-guiding net portion described in the present example can be employed in any of above described Examples 1 to 4 and the reference example as an alternative to the flow-guiding net portion thereof. Therefore, in the present example, with respect to the configurations other than that of the main body portion of the intake noise reduction portion (flow-guiding net portion), descriptions thereof are omitted.

FIG. 20 is a front view showing a main body portion of an intake noise reduction portion according to Example 7 of the present disclosure. In FIG. 20, only a main body portion and a frame body portion of an intake noise reduction portion 20Z are shown.

The flow-guiding net portion 21Z according to the present example is provided in an inner side of the frame body portion 22Z. The flow-guiding net portion 21Z is configured from a plurality of radial portions 21Za extending radially outward from the center of a circle of the frame body portion 22Z which has a circular planar shape, and a plurality of concentric circular portions 21Zb provided concentrically from the center of the circle. A mesh is formed of the plurality of radial portions 21Za and the plurality of concentric circular portions 21Zb. Note that, when the sealing device is disposed in the intake pipe, the center of the circle of the frame body portion 22Z is positioned in the vicinity of the center of a flow passage in the intake pipe. In other words, it can be said that the flow-guiding net portion 21Z is configured from the plurality of radial portions 21Za extending radially outward from the vicinity of the center of the flow passage in the intake pipe and the plurality of concentric circular portions 21Zb provided concentrically from the vicinity of the center of the flow passage in the intake pipe.

In the flow-guiding net portion 21Z configured as described above, the mesh is configured to be fine in the vicinity of the center of the circle of the frame body portion 22Z and to become coarser with distance from the center thereof. That is, in a state in which the sealing device is disposed in the intake pipe, the mesh of the flow-guiding net portion 21Z is configured to be fine in the vicinity of the center of the flow passage in the intake pipe and to become coarser with distance from the vicinity of the center thereof. Note that, in the present example, the plurality of radial portions 21Za are configured such that an angle between any two neighboring radial portions 21Za would be substantially equal. In addition, the plurality of concentric circular portions 21Zb are configured such that a distance in the radial direction between any two neighboring concentric circular portions 21Zb would be substantially equal. Accordingly, the mesh of the flow-guiding net portion 21Z is configured such that it is fine in the vicinity of the center of the circle of the frame body portion 22Z and becomes coarser with distance from the center thereof. Note that, in the present example, the floe-guiding net portion 21Z is provided over the entire region within the frame body portion 22Z.

<Advantages of Intake Noise Reduction Portion according to Present Example>

In the beginning of an opening of the throttle valve 300, the air flowing through two places most distant from the rotating axis of the throttle valve 300 are main flows. In the intake noise reduction portion 20Z according to the present example, the mesh of the flow-guiding net portion 21Z disposed on the downstream side of the throttle valve 300 is configured to be fine in the vicinity of the center of the flow passage in the intake pipe and to become coarser with distance from the vicinity of the center. Accordingly, since the air tends to flow through a coarse region within the mesh, the air flow is guided such that more air flows through the region within the intake pipe that is more distant from the vicinity of the center.

Accordingly, it is possible to suppress merging of the air flow through the above described two places. Consequently, it becomes possible to reduce unusual noise In addition, with respect to the flow-guiding net portion 21Z according to the present example, the mesh thereof is formed of the plurality of radial portions 21Za extending radially outward from the vicinity of the center of the flow passage in the intake pipe, and the plurality of concentric circular portions 21Zb provided concentrically from the vicinity of the center. Accordingly, it is possible to realize the flow-guiding net portion 21Z in which the mesh is configured to be fine in the vicinity of the center of the flow passage in the intake pipe and to become coarser with distance from the vicinity of the center. Note that, in the case where the flow-guiding net portion 21Z is configured form an elastic body, the flow-guiding net portion 21Z elastically deforms due to the air flow. However, since the mesh is formed of the plurality of radial portions 21Za and the plurality of concentric circular portions 21Zb as described above, a shape obtained by projecting the flow-guiding net portion 21Z in a direction of the air flow changes little between before and after the deformation. Accordingly, the flow-guiding function can be stably exerted. In addition, when the flow-guiding net portion 21Z is elastically deformed, a uniform force acts on the radial portions 21Za, and hence a uniform force acts on the entire flow-guiding net portion 21Z. Therefore, the flow-guiding net portion 21Z is superior in durability.

Example 8

Figure 21:
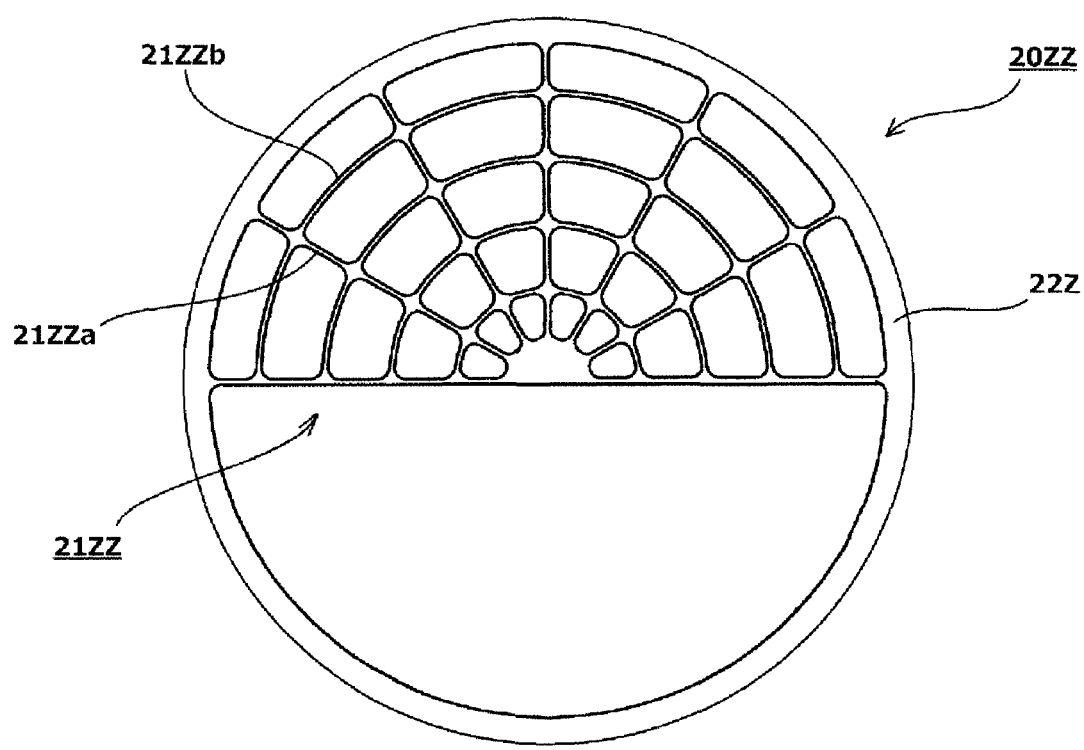
FIG. 21 is a front view showing a main body portion of an intake noise reduction portion according to Example 8 of the present disclosure.

Example 8 of the present disclosure is shown in FIG. 21. In above described Example 7, the configuration is described in which the flow-guiding net portion is provided over the entire region within the frame body portion. On the other hand, in the present example, a configuration is described in which a flow-guiding net portion is provided over a substantially semicircular region in an inner side of a frame body portion. Other components and their effects are the same as those in the Example 7, and hence the same components are denoted by the same reference numerals and the explanations thereof are omitted.

A flow-guiding net portion 21ZZ in the present example is also configured from a plurality of radial portions 21ZZa extending radially outward from the center of a circle of a frame body portion 22Z having a circular planar shape, and a plurality of concentric circular portions 21ZZb provided concentrically from the center of the circle, as in the case of Example 7. In the case of above described Example 7, the flow-guiding net portion 21Z is provided over the entire region within the frame body portion 22Z having the circular planar shape, whereas the flow-guiding net portion 21ZZ is provided to occupy substantially half of the region within the frame body portion 22Z. Note that the remaining substantially semicircular region is a hollow. Other configurations are the same as those described in Example 7.

Also from the intake noise reduction portion 20ZZ of the present example, the same effects as those from Example 7 can be obtained. Note that it is preferable to employ the intake noise reduction portion 20ZZ according to the present example in a case where the throttle valve may hit the flow-guiding net portion 21ZZ due to the relative disposition of the flow-guiding net portion 21ZZ.

(Others)

In each of above described Examples 7 and 8, the configuration is described in which the pipe of the intake pipe is configured in a cylindrical shape. Due to this, the configuration is described in which the frame body portion in the sealing device is configured in a circular ring shape. However, the sealing device according to the present disclosure can also be applied in cases where the pipe of the intake pipe is not configured in a cylindrical shape. For example, when the pipe of the intake pipe has a rectangular shape on a cross section perpendicular to the flowing direction of the air, the frame body portion may be configured to have a rectangular planar shape. Note that, even in this case, with respect to the flow-guiding net portion provided in the inner side of the frame body portion, the flow-guiding net portion having a configuration similar to the configuration described in Examples 7 and 8 can be used. However, in this case, concerning the plurality of concentric circular portions, it goes without saying that several concentric circular portions on the outer side may be formed in an arcuate shape rather than a semicircular shape or a circular shape.

In Examples 7 and 8, the configuration is described in which the mesh of the flow-guiding net portion is formed of the plurality of radial portions extending radially outward from the vicinity of the center of the flow passage in the intake pipe, and the plurality of concentric circular portions provided concentrically from the vicinity of the center. This configuration is particularly effective when the flow-guiding net portion is formed of an elastic body. However, the merging of the air flows through the two places can be suppressed as long as the mesh of the flow-guiding net portion is configured to be fine in the vicinity of the center of the flow passage in the intake pipe, and to become coarser with distance from the vicinity of the center. Therefore, depending on usage conditions and the like, instead of forming the mesh with the radial portions and the concentric circular portions as described above, the mesh may be formed of, for example, a plurality of portions extending longitudinally and laterally. In this case, instead of setting the longitudinal and lateral distances between the portions uniform, by setting the distances to become narrower toward the vicinity of the center of the flow passage in the intake pipe, it is possible to obtain the flow-guiding net portion in which the mesh is fine in the vicinity of the center of the flow passage in the intake pipe and becomes coarser with distance from the vicinity of the center.

REFERENCE SIGNS LIST 10, 10X, 10a: Gasket portion
11X: Gasket main body portion
12X: Coupled portion
13X: Cylindrical portion
20, 20X, 20Y, 20Z, 20ZZ: Intake noise reduction portion
21, 21a, 21X, 21Xa, 21Z, 21ZZ: Flow-guiding net portion
21Y: Suspended portion
21Ya: Through-hole
21Za, 21ZZa: Radial portion
21Zb, 21ZZb: Concentric circular portion
22, 22X, 22Y, 22Z: Frame body portion
23, 23a: Cylindrical portion
23X, 23Xa: Fitted portion
24: Flange portion
200: Intake pipe
210: Intake manifold
220: Throttle body
300: Throttle valve
24a: Through-hole
25: Elastically deforming portion
30: Elastically deforming portion
31: One end portion
32: Another end portion
40: Elastically deforming portion
100, 100X: Sealing device
210: First pipe
220: Second pipe
211, 221: Flange portion
211a: Annular groove
300: Throttle valve

The invention claimed is:

1. A sealing device that comprises a gasket portion made of an elastic body for sealing a space between an end surface of one of two pipes configuring an intake pipe and an end surface of another of the two pipes, and an intake noise reduction portion for reducing intake noise,
wherein the intake noise reduction portion comprises:
a main body portion for reducing intake noise;
an annular frame body portion for supporting the main body portion;
a tubular portion that extends from the frame body portion in a direction in which the pipes extend, and is fitted into an inner circumferential surface of either one of the one pipe and the other pipe; and
a flange portion that extends from an end portion of the tubular portion toward an outer circumferential surface side, and is disposed in the space between the end surfaces of the one pipe and the other pipe, and
the gasket portion is provided on both surfaces of the flange portion.

2. The sealing device according to claim 1, wherein the main body portion is configured from a flow-guiding net portion for guiding a gas flowing in the intake pipe.

3. The sealing device according to claim 1, wherein the main body portion is configured from a plurality of suspended portions that are configured to sway in response to a gas flow.

4. The sealing device according to claim 3, wherein each of the plurality of suspended portions are provided with at least one through-hole.

5. The sealing device according to claim 2, wherein the flow-guiding net portion is configured such that a mesh thereof is fine in a vicinity of a center of a flow passage in the intake pipe and becomes coarser with distance from the vicinity of the center.

6. The sealing device according to claim 5, wherein the mesh of the flow-guiding net portion is formed of a plurality of radial portions extending radially outward from the vicinity of the center of the flow passage in the intake pipe and a plurality of concentric circular portions provided concentrically from the vicinity of the center.

7. A sealing device that comprises a gasket portion made of an elastic body for sealing a space between an end surface of one of two pipes configuring an intake pipe and an end surface of another of the two pipes, and an intake noise reduction portion for reducing intake noise,
wherein the intake noise reduction portion comprises:
a main body portion for reducing intake noise;
an annular frame body portion for supporting the main body portion;
a tubular portion that extends from the frame body portion in a direction in which the pipes extend,
an elastically deforming portion that is provided on an outer circumferential surface of the tubular portion, and is in close contact with an inner circumferential surface of either one of the one pipe and the other pipe thereby supporting the tubular portion in its positioned state within the pipe by an elastic repulsive force thereof; and
a flange portion that extends from an end portion of the tubular portion toward an outer circumferential surface side, and is disposed in the space between the end surfaces of the one pipe and the other pipe, and
the gasket portion is provided on both surfaces of the flange portion.

8. The sealing device according to claim 7, wherein the main body portion is configured from a flow-guiding net portion for guiding a gas flowing in the intake pipe.

9. The sealing device according to claim 7, wherein the main body portion is configured from a plurality of suspended portions that are configured to sway in response to a gas flow.

10. The sealing device according to claim 9, wherein each of the plurality of suspended portions are provided with at least one through-hole.

11. The sealing device according to claim 8, wherein the flow-guiding net portion is configured such that a mesh thereof is fine in a vicinity of a center of a flow passage in the intake pipe and becomes coarser with distance from the vicinity of the center.

12. The sealing device according to claim 11, wherein the mesh of the flow-guiding net portion is formed of a plurality of radial portions extending radially outward from the vicinity of the center of the flow passage in the intake pipe and a plurality of concentric circular portions provided concentrically from the vicinity of the center.

* * * * *